Jan. 12, 1954　　　M. WALLACE　　　2,666,198
SYNCHROMETRIC RADAR SYSTEM
Filed March 15, 1948　　　　　　　　　　6 Sheets-Sheet 4
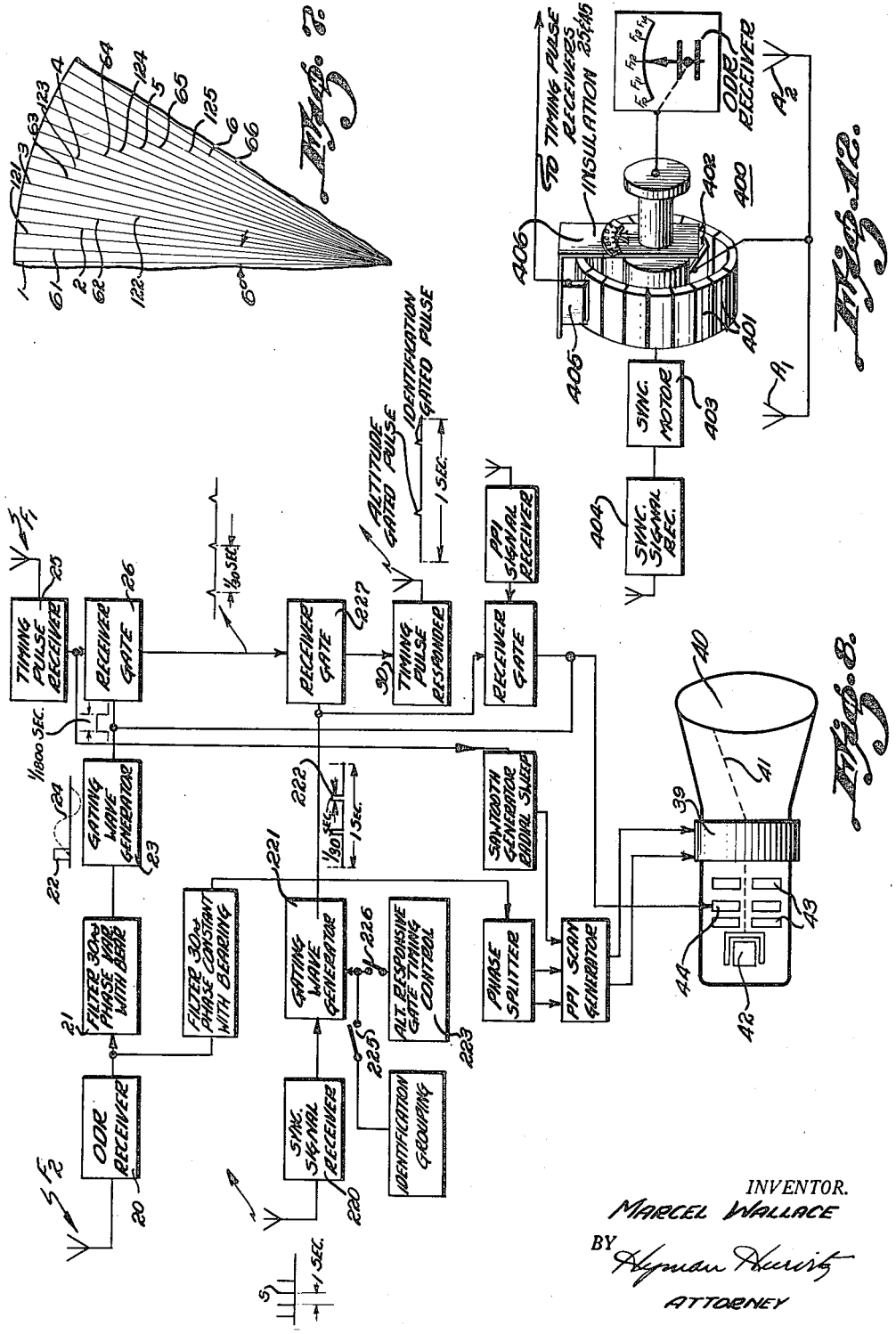
INVENTOR.
MARCEL WALLACE
BY
ATTORNEY

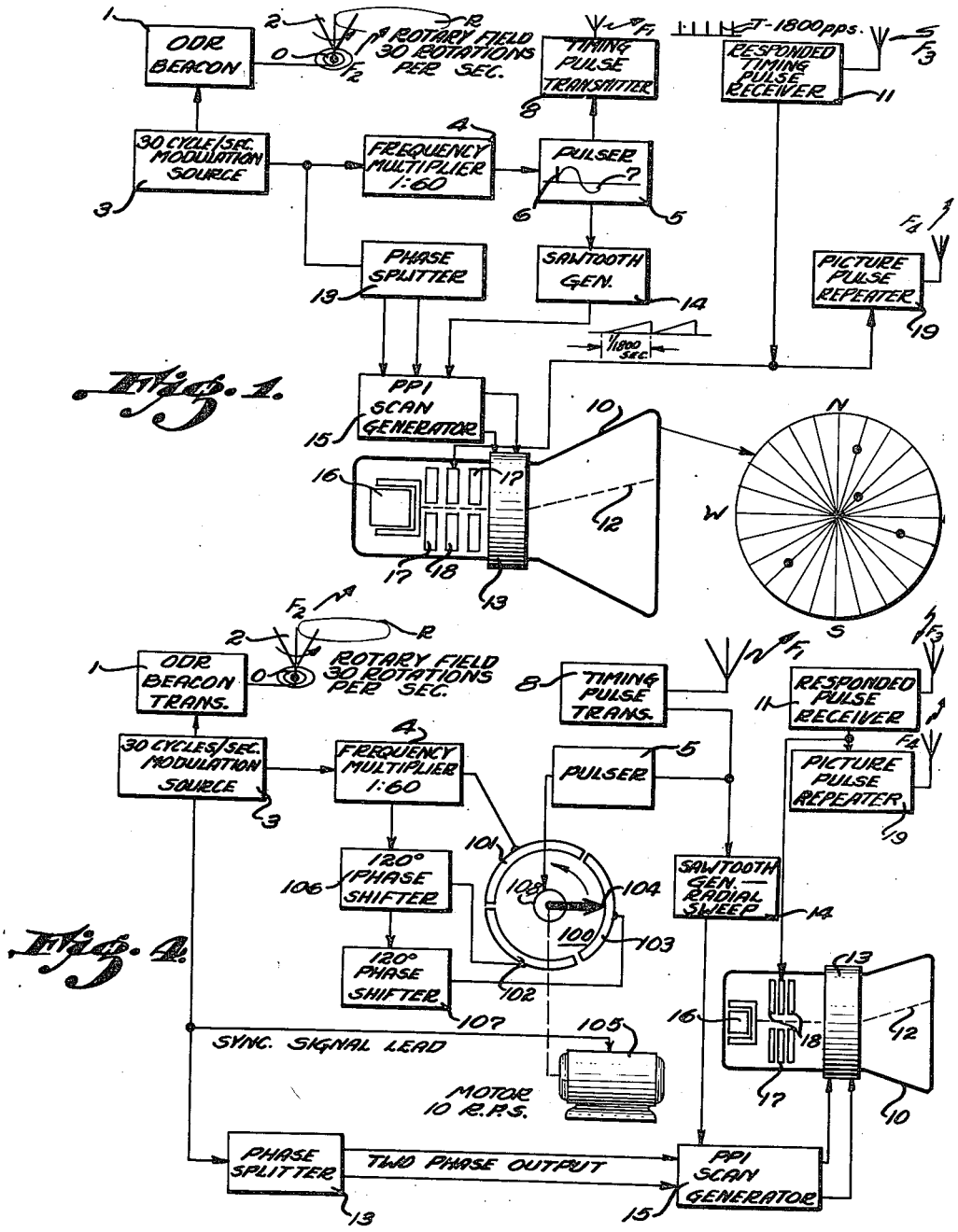

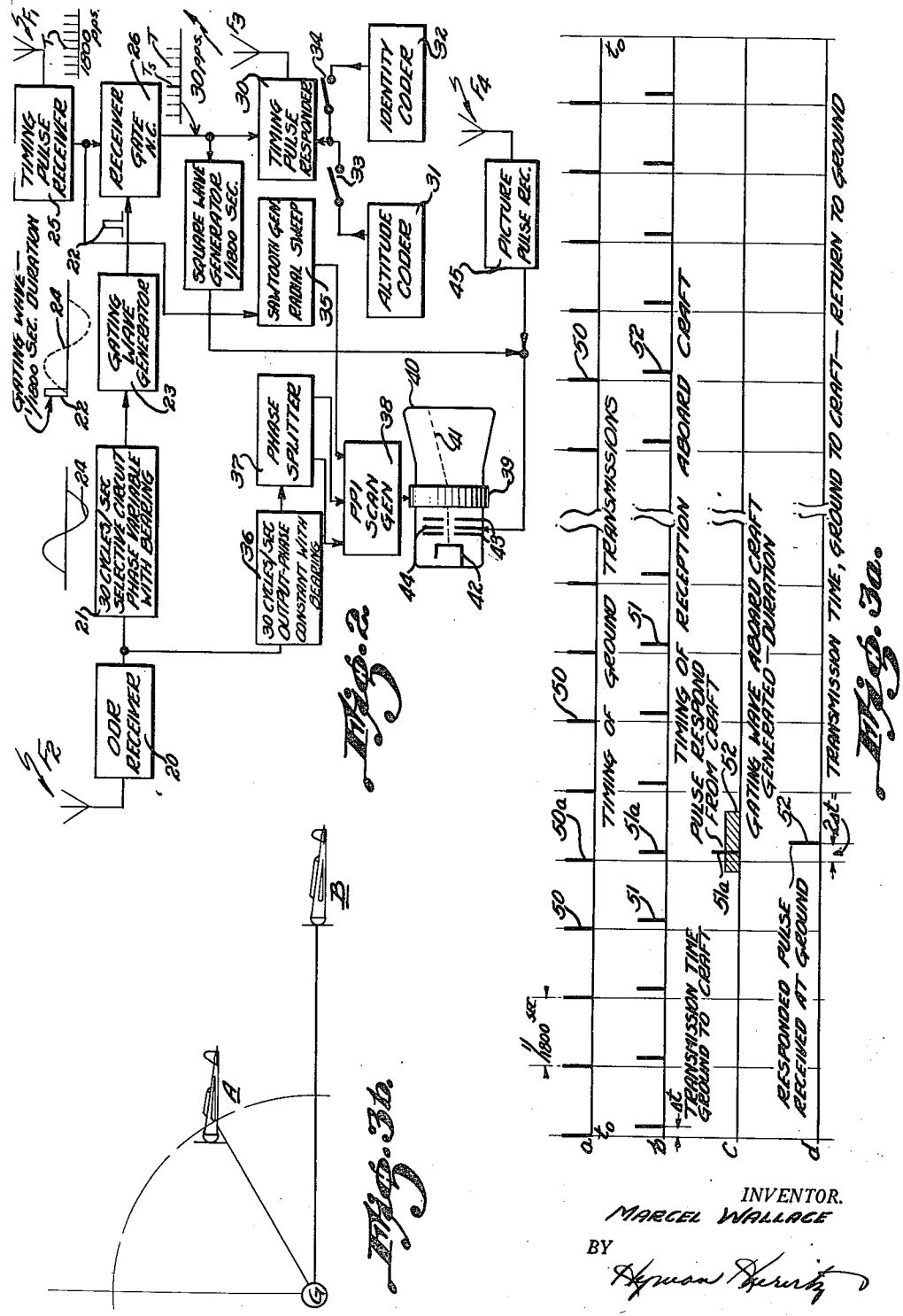

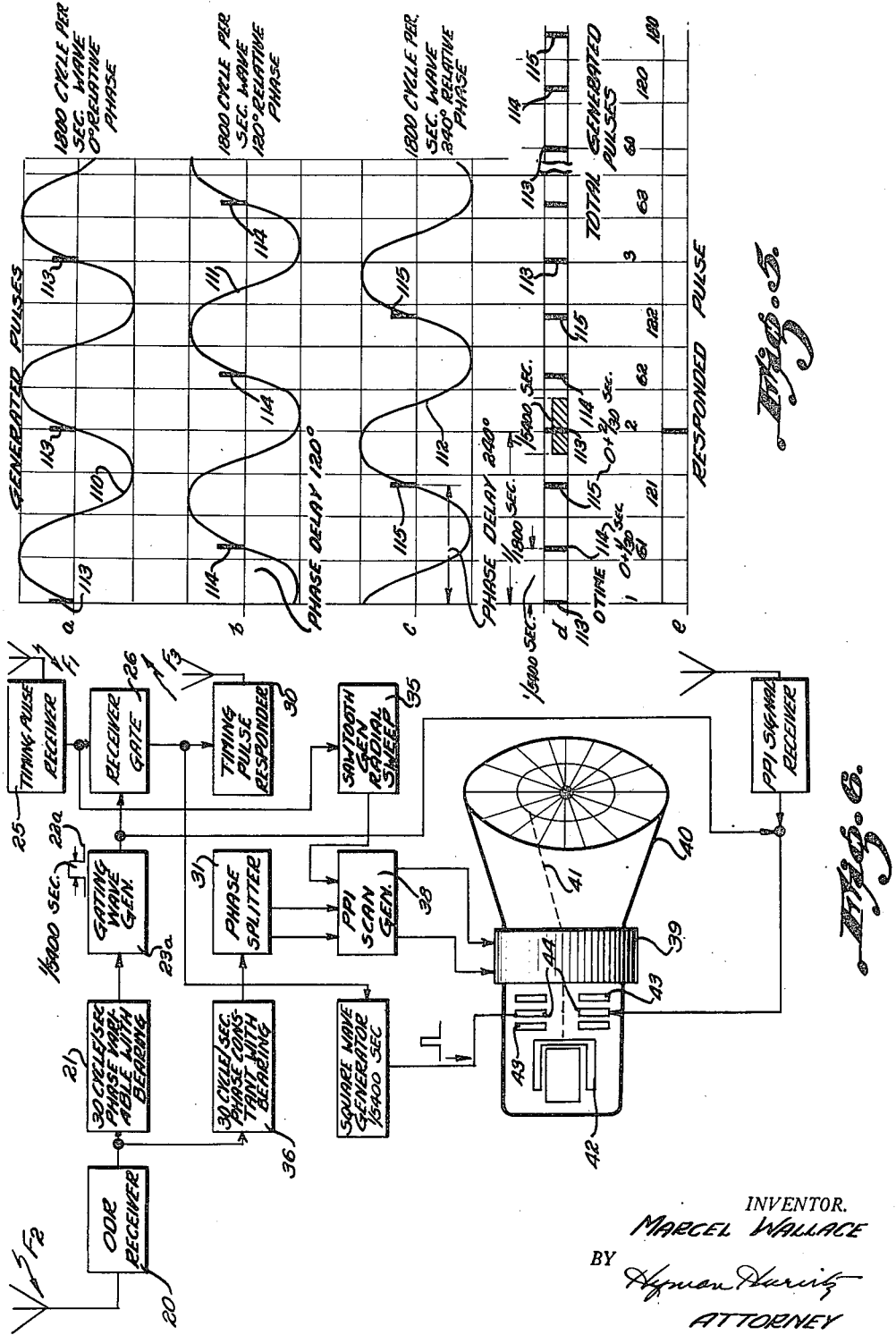

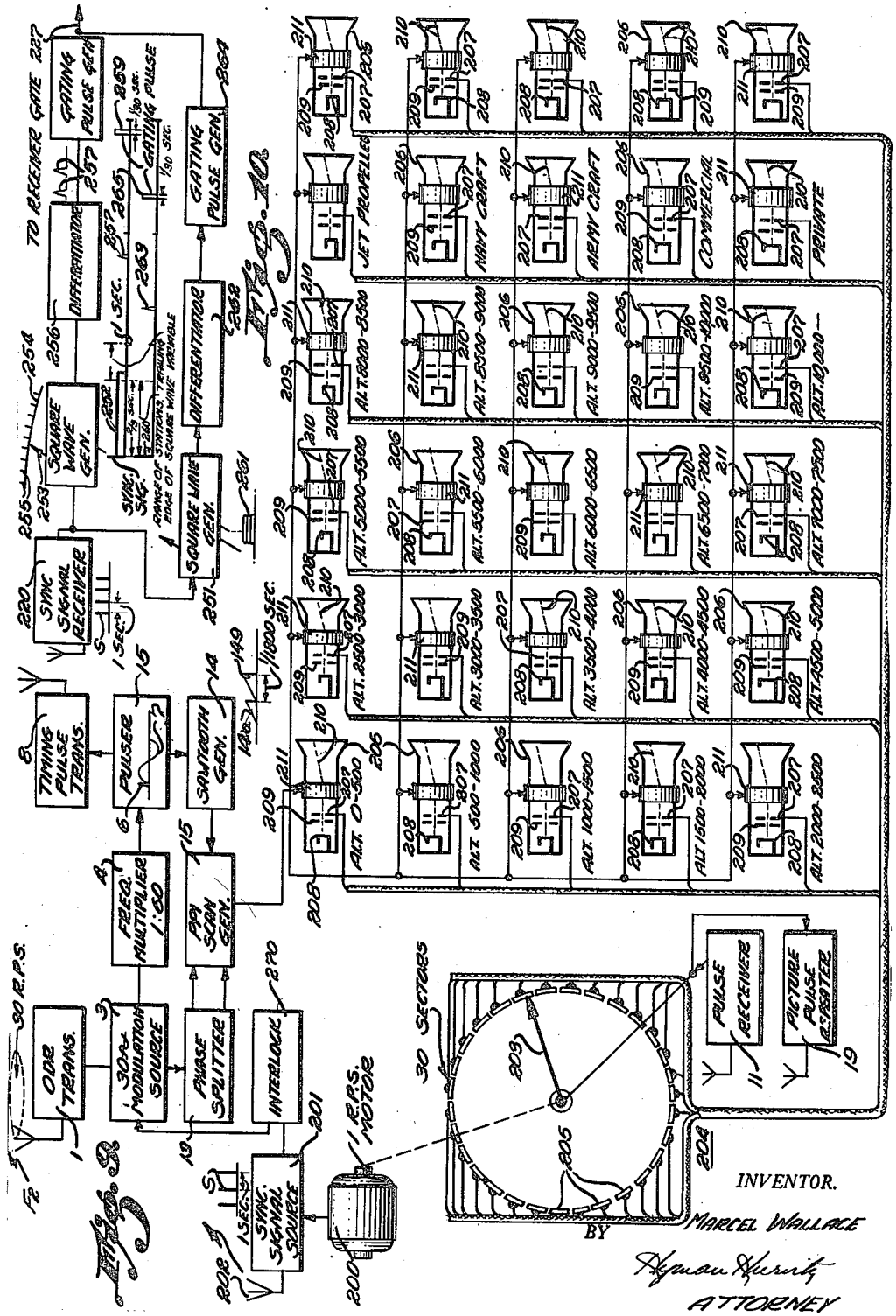

Jan. 12, 1954

M. WALLACE 2,666,198

SYNCHROMETRIC RADAR SYSTEM

Filed March 15, 1948

INVENTOR.
MARCEL WALLACE
BY
ATTORNEY

Patented Jan. 12, 1954

2,666,198

UNITED STATES PATENT OFFICE 2,666,198

SYNCHROMETRIC RADAR SYSTEM

Marcel Wallace, East Portchester, Conn., assignor, by mesne assignments, of one-half to said Wallace, doing business as Panoramic Laboratories, East Portchester, Conn.

Application March 15, 1948, Serial No. 14,852

17 Claims. (Cl. 343—11)

This invention relates generally to radio aids to air navigation and particularly to systems for measuring and reporting from each of a plurality of aircraft to the remainder of the plurality, and/or to a ground located station, the range, bearing, altitude and identification of the craft, providing at each craft its position relative to the remaining craft of the plurality, and to the ground station.

Briefly described, the present invention provides for the transmission, in conjunction with transmissions from an omni-directional range beacon transmitter, of short equally spaced pulses of radiant energy, hereinafter referred to as timing pulses, occurring in timed relation to the beacon transmissions, and transmitted omnidirectionally. The words "omnidirectional range" will hereinafter be abbreviated to ODR, for convenience. The ODR beacon transmits a rotary directional pattern of energy, the rate of rotation in the present standard system being 30 rotations per second, and, additionally, transmits a carrier omni-directionally which carries a reference modulation of 30 cycles per second. The 30 cycle modulation is received aboard all aircraft in a phase which does not vary with bearing of the craft. The rotating pattern gives rise to a 30 cycle signal at each craft which bears a phase directly related to the bearing of the craft with respect to the ODR beacon. In the normal operation of the ODR system the phases of the omni-directional and of the bearing-representative 30 cycle signals are compared aboard each craft to determine the bearing of the craft with respect to the ODR beacon.

The timing pulse transmissions may occur in definite timed relation to the rotations of the directional pattern of the ODR beacon, at a rate which, for the sake of example, may be taken as 60 pulses for each rotation of the directional pattern.

The ODR beacon and the timing pulse transmitter will be collectively referred to as the "ground station" hereinafter, for the sake of conciseness.

A cathode ray tube indicator may be provided at the ground station to which is applied beam deflection currents of the character required to provide plan-position indications, i. e. rapid radial scan on which is superimposed a relatively slow rotation of the rapidly scanning radius. The slow rotation may be synchronized with the rotation of the directional rotary beam of the beacon, while the rapid radial scanning may be synchronized with the pulse transmissions, each radial scan being initiated simultaneously with transmission of a timing pulse. In my assumed example, then, the radial scanning occurs at the rate of 60×30=1800 scans per second. Each scan is separated angularly from its predecessor by an angle of $$\frac{360°}{60}=6°$$

The latter angle corresponds then with the angular resolution of the system. This resolution may be decreased by increasing the ratio of pulse repetition rate to the rate of rotation of the directional pattern provided by the beacon.

Each aircraft in the system carries an ODR receiver. This receiver provides as one component of output, a signal having a frequency determined by the rate of rotation of the ODR transmitted beam, and a phase determined by the bearing of the craft with respect to the ODR transmitter. Each craft additionally carries a pulse transponder, the pulse receiver of which is responsive to the timing pulses, and the responder of which, in response to triggering pulses applied thereto, transmits a return or responded pulse on a frequency different from that of the received timing pulse. The applied triggering pulses are derived from the timing pulse receiver, but are applied to the responder on a selective basis, only one pulse of each sixty received timing pulses being permitted to initiate a response. That one pulse is selected in accordance with the phase of that 30 cycle output of the ODR receiver which possesses phase variable with bearing, the latter being caused to generate a gating signal, once in each cycle of the 30 cycle output, the gating wave having a duration equal to $\frac{1}{1800}$ second, or to the time separation of the timing pulses, and serving to open a normally closed gate existing between the radar pulse receiver and the responder. The responded pulses, accordingly, occur at the rate of 30 per second and each possesses a time position with respect to a time base having a duration of $\frac{1}{30}$ second, and which is provided by the DOR beacon, which is characteristic of the craft's bearing as measured by the ODR receiver. The responded pulses are received at the ground station after a time delay with respect to time of transmission of the original or timing pulse, which is representative of the craft's range.

The responded pulses as received at the ground station are applied in intensifying relation to the intensifier grid of the cathode ray tube indicator referred to above. The indicator provides a visible indication, in response to the pulses, at a radial position on the face of the indicator corresponding with the range of the craft, and at an angular position corresponding with the bearing of the craft.

The pulses as responded by the aircraft may be coded by an altitude coder, or by an identity coder, or both, in a manner to enable determination of the craft's altitude and/or identification by visual inspection of the indications on the face of the cathode ray tube indicator.

The output of the responded pulse receiver on the ground may be re-transmitted or repeated to all adjacent air craft, if desired, to enable presentation on the aircraft of the plan position information present on the face of a cathode ray tube indicator at the ground station. The radial scan of the beam of a cathode ray tube indicator on the aircraft may be synchronized by received timing pulses, while the angular scan of the beam is synchronized with the 30 cycle signal of constant phase, provided by the ODR receiver. The pulses re-transmitted from the ground are referred to hereinafter as picture pulses. Reception of picture pulses aboard the craft effects intensification of the beam of the airborne indicator, and the position of the resultant pip or spot on the face of the indicator is radially determined by the elapsed time between reception of a timing pulse at the craft and reception of a picture pulse at the craft. This time is precisely equal to the transmission of radiant energy from the craft to the ground station and return to the craft, and corresponds with the range of the craft from the ground station. Since only one pulse, of each sixty interrogating pulses available at the craft is actually responded, and since this pulse is timed with respect to the rotation of the beam of the indicator in accordance with the bearing of the craft, the picture pulse arrives at the craft at a time, with respect to the 1/30 second time base provided by the omni-directional 30 cycle modulation at the ODR receiver, which is suitable for indicating bearing of the craft.

Since all the craft adjacent a given ODR transmitter are provided with an identically phased 1/30 second time base by the omni-directional transmissions from the station, the responses from each of the craft to the ground station is indicative of bearing of that craft, and these responses are so translated by the cathode ray tube indicator at the ground station. Upon re-transmission of responded signals from the ground station, and reception of these pulses aboard other aircraft of the system, an identical indication is provided on the cathode ray tubes aboard these craft with that present on the cathode ray tube at the ground station.

That the picture pulses indicate ranges of remote craft with respect to the ground station, aboard all the craft, despite the differences in their ranges, will be demonstrated mathematically in the detailed exposition of the various embodiments of the invention, provided hereinafter.

Each aircraft receiving the picture pulses from the ground is enabled to derive its own distance, not only by visual observation of the screen, but also by gating the picture pulse which comes in response to its own signal, and converting the time interval into a distance indication on a meter by means of equipment similar to that of a conventional distance measuring equipment (DME). Thus, the airborne responder becomes an airborne DME transmitter, the ground receiver and picture transmitter becomes respectively ground DME receiver and transmitter, and the airborne picture receiver is the airborne DME receiver.

One factor which must be taken into account in considering the invention as described hereinbefore relates to the fact that the resolution in indicated bearing is unduly coarse when there is utilized a ratio of pulse repetition rate to the ODR beam rotation rate equal to 60, but that any increase in this ratio, which can be accomplished practically only by an increase in pulse repetition rate, the characteristics of the ODR system being determined and unchangeable, may be accomplished only at the cost of a decrease of the maximum range which may be measured in the system. For example, a range of one mile involves a pulse transmission time of approximately 10.6 micro-seconds. A pulse repetition rate of 1800 C. P. S. involves, then, a total pulse time separation of about 550 micro-seconds, equivalent to a range of about 50 miles. This range in itself is sufficient for most purposes, but its diminution is undesirable.

I have devised a modification of the system of the invention as above described, which provides a radical improvement in bearing resolution without requiring an accompanying decrease of range. In fact, if desired, the maximum available range may be increased even while the bearing resolution is being improved. The improvement requires, however, a diminution in the rate of transmission of responded pulses. An improvement in resolution of $m$ times, and an increase in range of $n$ times, in the modified system, effects a diminution of the rate of response by a factor of $nm$.

Improvement in resolution

Fundamentally, the modification of the system referred to in the above paragraph involves transmission of timing pulses from the ground station for a first period in one time phase with respect to the 30 cycle rotation rate of the ODR pattern, then for a further period in a second time phase, displaced with respect to the first phase, by $360/m$ and thereafter in a third time phase equally displaced, during a further period, and so on up to $m$ phases, each additional phase utilized providing, if properly selected, a proportionate improvement in range resolution.

The airborne equipment may be similar to that above described except that the gating wave is shortened in proportion to the number of different phases utilized in connection with the timing transmissions. Accordingly, one pulse is not transponded for each rotation of the ODR beam, as was the case in the system first described, but this rate is reduced in proportion to $m$, the number of different phases utilized. Gating of received radar pulses is accomplished, then, both with respect to phases of transmission, one of which is selected, and also with respect to one only of the plurality of pulses occurring in the period or having the phase selected by the first gate.

The changes in phase correspond with angular displacements of the beam of the CRT, which in turn correspond with changes of indicated bearing. Bearing resolution has thus been improved by a factor $m$ equal to the number of different phases allotted to the timing pulses.

Increase in range

In order to increase the maximum range of the system, the timing pulse repetition rate may be decreased, effecting a decrease in bearing resolution. The latter decrease may be compensated for by accomplishing timing pulse transmissions in successively different phases or time positions with respect to the 1/30 second period of rotation of the ODR beam, as explained hereinbefore. Otherwise expressed, maximum range of the system may be increased by a factor of $n$ by proportionately decreasing the pulse repetition rate, and the consequent loss of bearing resolution compensated for by transmitting the timing pulses in $n$ successive groups, each of the groups having a phase displaced with respect to the 1/30 second period, by $360/n$.

Still a further modification of the present invention involves the addition at each aircraft of a further time gating system controlled in accordance with either the altitude or an identification grouping of the craft. The further time gating system selects for passage to the responding transmitter one of each arbitrarily selected group of pulses available in the output of the bearing gate, in either of the systems above briefly described. The number of pulses selected to make up a group is determined by the number of layers of altitude or of identifiable groups which it is desired to separate. The selected pulse occupies a numerical position within the group determined by the altitude or group identification of the craft.

At the ground station a separate cathode ray tube indicator may be provided for each layer of altitude or each identification grouping and a commutator provided to route signals to different ones of the indicators in accordance with the numerical positions of received pulses within the group, the radial and angular motions of the beams of the indicators being effected in the manner hereinbefore described for the system, when no discrimination in respect to altitude or identification grouping is accomplished.

At the ground station is thus presented the plan positions of craft segregated on different indicators in accordance with altitude layers occupied by the craft.

The plan position indicator normally provided aboard the aircraft may likewise be gated in accordance with altitude or identification grouping, utilizing the same gating wave as is otherwise utilized to gate responses in accordance with altitude and identification grouping so that aboard each craft may be presented the plan positions of only those remote craft occupying the same altitude layer or the same identifiable group as the craft first referred to.

It will be recalled that in the simplest system above briefly described, 1800 pulses per second were transmitted from a ground station to each of a plurality of aircraft and that each aircraft suppressed certain of these pulses and retransmitted others, the retransmitted pulses being selected in accordance with the bearing of the craft from the ground station as determined from transmissions provided by an ODR beacon. The pulse repetition rate of 1800 per second was selected as a compromise value and is mentioned for purposes of exemplification only and not as an essential feature of the invention. It will further be recalled that the ODR beacon provides transmission having a modulation frequency of 30 cycles per second so that in our example, 60 pulses are transmitted for each cycle of modulation provided by the beacon station. Of these 60 pulses, one is selected for retransmission from the aircraft, that one pulse having a time position with respect to the phase of the ODR beacon modulation determined by bearing of the craft. Accordingly, each craft transmits a total of 30 pulses per second and each of these pulses contains exactly the same navigational information as any other of the pulses.

It has further been mentioned that the pulses transmitted from the aircraft may be gated so that selected ones only of these pulses are transmitted and the selection may be accomplished in accordance with the altitude of the craft or in accordance with the identification grouping of the craft.

In accordance with a further modification of the invention, selection within each group of 30 pulses transmitted during each second from each craft in the system may be accomplished in respect to both altitude and identification grouping. For this purpose, each group of 30 cycles is subdivided into two subgroups and one pulse from each subgroup is transmitted, one of the subgroups relating to altitude and the other to identification grouping. At the ground station, the 30 pulse time intervals within each second are separated by means of a commutator arrangement having 30 commutator segments and a switch arm rotating at the rate of one revolution per second, each of the commutator segments being coupled with a different CRT indicator and the CRT indicators being arranged in subgroups corresponding with the gating subgroups established aboard the aircraft. Accordingly, when a pulse within one of the subgroups is received from an aircraft, it is routed by the commutator to a CRT which provides indications which are limited to a specific range of altitudes, and when a pulse is received in the remaining subgroup it is routed to a CRT in the remaining subgroup of CRT's which correspond with a specific plane category or identification grouping.

At the ground station, then, is provided a display consisting of 30 CRT's, certain ones of which present PPI displays of the positions of aircraft occupying predetermined altitude layers while the remaining indicators provide displays of plan positions of craft arranged by categories or identification grouping regardless of altitude. An operator at the ground station may readily determine the relative locations of craft in any desired altitude layer or the relative locations of craft in certain categories such as private aircraft, commercial aircraft, transcontinental aircraft, Navy aircraft, Army aircraft, and the like.

No mention has been made hereinbefore of the manner in which confusion between transmissions of adjacent ground stations may be avoided. In general, in a system which is intended to cover a wide area, many ground stations will be operating simultaneously, and it is essential that any given aircraft operate with respect to one only of these stations to the exclusion of all others, since otherwise aircraft so located that they may receive ODR transmissions from two different beacons and pulse timing or picture transmission signals from two stations, will receive erroneous indications essentially because the cathode ray tube picture indicators will be supplied with two separate, non-related groups of synchronizing signals.

In general ODR stations operate on selected channels within a band, allocated to the purpose, the frequency for any given ODR beacon being selected to avoid interference with adjacent beacons.

The ODR receivers aboard the separate aircraft are tunable to the allocated channels, and a pilot, desiring to obtain a bearing from a given station, say Washington, D. C., has only to adjust his channel selector accordingly. There is, therefore, no possibility of confusion of ground stations aboard the separate aircraft, in respect to transmissions from the ODR beacons.

A similar expedient may be resorted to in respect to the various signals required for picture transmissions, i. e., frequency allocation may be resorted to, insofar as is practically found necessary, and in respect to the various frequencies utilized for interrogating from the ground, in respect to the frequencies utilized for responding from the various craft, and in respect to the frequencies utilized by the picture pulse repeaters on the ground.

It is highly desirable that the frequencies utilized for timing pulse transmissions, responded pulse transmissions and picture pulse transmissions, respectively, be identical throughout the country, to simplify the equipment required to practice the present invention. Accordingly, the timing pulse transmissions are effected on a time division basis, from the various timing pulse transmitters, and synchronously operating commutating devices are provided aboard the separate craft for accepting timing pulses or picture pulses aboard any craft only from a timing pulse transmitter or picture pulse repeater associated with an ODR beacon to which the ODR receiver aboard that craft is tuned, to the exclusion of all other timing or picture pulses.

It is accordingly an object of the present invention broadly to provide an improved system of radio aids to air navigation.

It is a further object of the invention to provide a novel system of position reporting from aircraft to ground.

It is still a further object of this invention to provide a novel system for position reporting between aircraft flying in adjacent areas.

It is another object of the invention to provide a system of radio aid to air navigation wherein each of a plurality of aircraft determines its location with respect to a ground station and reports that location to the ground station and to adjacent aircraft or aircraft flying in adjacent areas.

Still a further object of the invention resides in the provision of a system for providing at a ground station and/or aboard each of a plurality of aircraft, indications of the altitude and/or the identification grouping of each of the aircraft.

It is still another object of the invention to provide a system of radio aid to navigation wherein each of the plurality of aircraft and a ground station is provided with visual indications of the range, bearing, altitude and group identification of all the craft of the plurality.

Still a further broad object of the invention resides in the provision of a novel radar system.

More specifically, it is an object of the invention to provide a radar system wherein pulse transmissions occur omni-directionally and wherein these pulses are retransmitted from aircraft after modulation thereof in accordance with bearing or altitude or identification grouping of the aircraft or any combination of these data.

Still more specifically, it is an object of the invention to provide a radar system wherein pulses are transmitted omni-directionally to a remote object and wherein selected ones only of the pulses received by the remote object are retransmitted, whereby selection is accomplished in accordance with bearing, altitude or identification grouping of the craft.

It is another object of the invention to provide a novel radar transponder having means for suppressing selected ones of pulses received thereby, and for retransmitting others, selection being accomplished in accordance with the value of a navigational quantity or the values of a plurality of quantities having navigational significance.

Still another object of the invention resides in the provision of a radar system which utilizes as an essential element thereof an ODR beacon.

More specifically, it is an object of the invention to provide a radar system wherein directional transmissions from an ODR beacon determine the selection of pulses for re-transmission from remote objects.

More specifically, again, it is an object of the invention to provide a navigational system wherein pulses are transmitted omni-directionally from a first station and are received aboard each of a plurality of remote stations and wherein signals from an ODR beacon are likewise transmitted to each of the remote stations, the ODR transmissions serving at each of the remote stations to select certain ones only of the omni-directionally transmitted pulses for retransmission, whereby at the first-mentioned station the transmission times of the pulses may be interpreted in terms of ranges of the aircraft and the selection of the pulses translated into bearing indications, each pulse transmitted from each aircraft establishing a visual indication of bearing and range on a PPI indicator.

It is still a further object of the invention to provide a system of the character described in the preceding paragraph wherein a further selection of pulses takes place, certain of those pulses, selected in accordance with bearing as determined by the ODR transmissions, being suppressed in accordance with the altitude measurements at each craft, or in accordance with the identification category of the craft, or both, and wherein separate displays may be remotely provided for separate categories of craft and for craft flying in different altitude layers.

Another object of the invention involves the provision of means in a multiple station beacon system for operating on a time-sharing basis, for the purpose of eliminating the possibility of confusion aboard aircraft with respect to the particular stations against which measurements of range and bearing are being accomplished.

The above and still further objects and features of the present invention will become evident upon consideration of the following detailed description of the various embodiments of my invention, especially when taken in conjunction with the accompanying drawings wherein:

Figure 1 is a functional block diagram of a simplified form of a ground station in accordance with present invention;

Figure 2 is a functional block diagram of an airborne station in accordance with the invention which is adapted particularly to operate in association with the ground station illustrated in Figure 1;

Figure 3A is a timing diagram which is utilized in explaining the operation of the system illustrated in Figures 1 and 2;

Figure 3B is a diagram showing the relative positions of a ground station and a pair of aircraft having random positions relative to the ground station, which is utilized in connection with a mathematical demonstration of certain properties of the system illustrated in Figures 1 and 2;

Figure 4 is a functional block diagram of a modification of the ground station illustrated in Figure 1, wherein provision is made from interlaced pulse transmissions;

Figure 5 is a timing diagram utilized in explaining the operation of the system of Figure 4;

Figure 6 is a functional block diagram of a modification of the airborne equipment illustrated in Figure 2 which is specifically adapted for operation in conjunction with the system of Figure 4;

Figure 7 illustrates the character of the interlaced scanning provided in the CRT indicators of Figures 4 and 6;

Figure 8 is a functional block diagram representing a modification of the system of the airborne stations illustrated in Figure 2, wherein provision is made for double gating in accordance not only with bearing as in the system of Figure 2, but also in accordance with altitude and identification category or grouping of the aircraft involved;

Figure 9 is a functional block diagram of a ground station adapted to cooperate with airborne stations of the character illustrated in Figure 8 and having provision for displaying separately the plan positions of aircraft in different altitude layers and in different identification categories or groupings;

Figure 10 is a functional block diagram of a gating wave generator system of the character utilized in the system of Figure 8 of the drawings illustrating the method of generating gating waves in detail;

Figure 11:
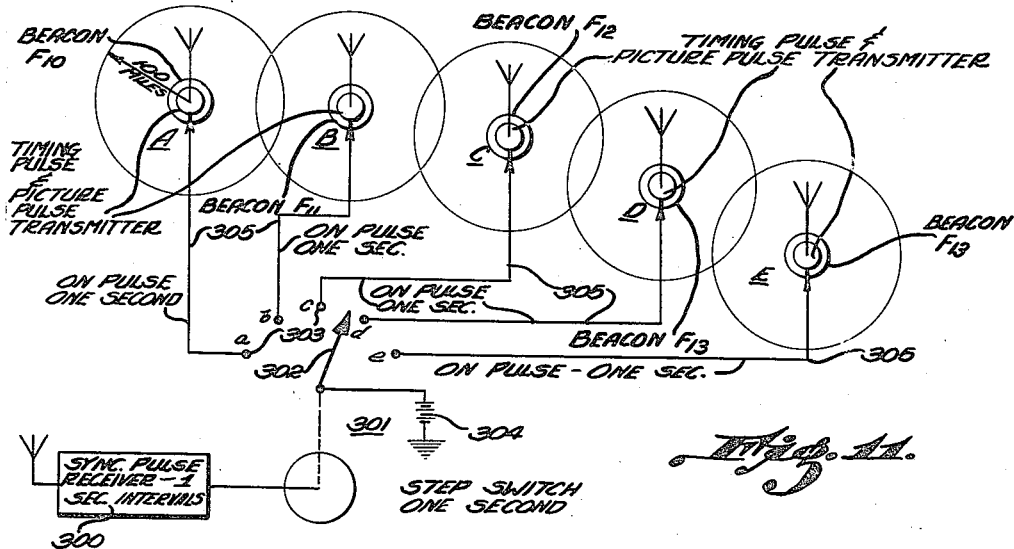
Figure 11 illustrates functionally a system of ODR beacons operating an a time-sharing basis.
Figure 13:
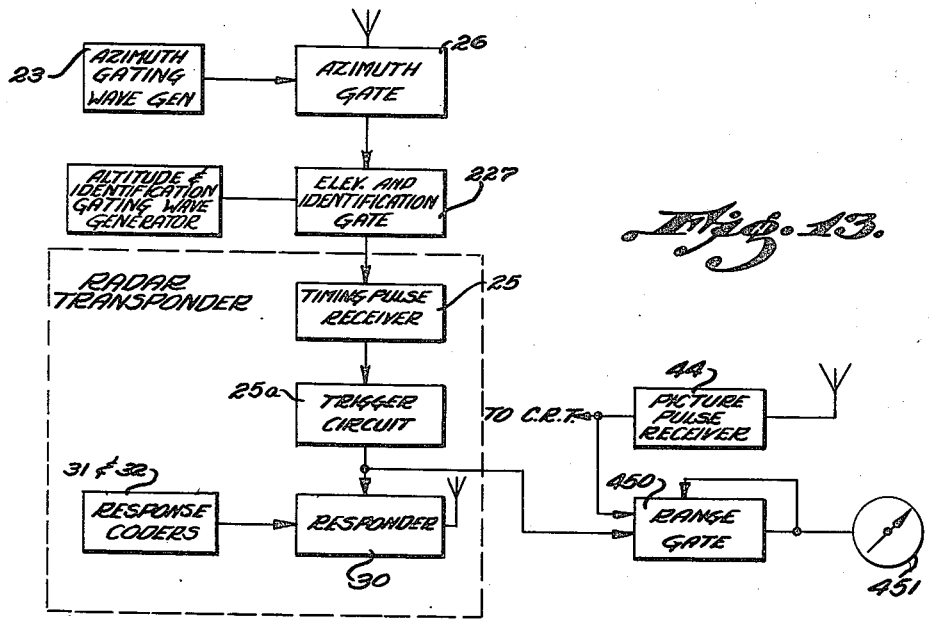

Figure 12 represents an airborne selector system which enables selection aboard any aircraft of one only of the beacon stations of Figure 11 to the exclusion of the others; and Figure 13 is a functional block diagram showing a modification of the system of Figure 2 of the drawings, arranged in such manner as to establish a parallelism between the present system and a known time of distance-measuring equipment which has been selected as standard by the Civil Aeronautics Administration.

Reference is now made to the accompanying drawings, and particularly to Figure 1 thereof, which illustrates in conventional block diagram the arrangement of a ground station in the present system.

The system illustrated in Figure 1 represents a simplified form of the present invention, various modifications and improvements of which will be described hereinafter.

Use is made in the present system of transmissions from an ODR beacon transmitter, which is of conventional character, and of the type which has been approved for installation throughout the United States by the Civil Aeronautics Administration (C. A. A.) as a radio aid to aerial navigation. It will be realized that the particular type of ODR beacon transmitter which is disclosed herein is not essential to the invention, in its broader aspects, and that other types of beacon transmitters which are known to the art may be utilized instead. As a practical matter, however, it may be assumed that the present invention will be practiced in conjunction with the standard or C. A. A. approved ODR beacon system, since that system will in any event be installed and utilized in this country, and probably internationally. Accordingly, the invention is explained with reference to the standard or C. A. A. approved ODR beacon system.

The reference numeral 1, in Figure 1, denotes an ODR beacon or transmitter which energizes an antenna array 2, conventionally illustrated as comprising a single antenna, for the sake of simplicity, but which in actuality comprises a plurality of cooperating antennas which together provide a proper field pattern of radiation for the performance of the ODR function.

Briefly described, the standard ODR beacon 1 and its associated antenna array 2 provide and radiate two distinct patterns of energy, one comprising an omni-directional pattern O, at a radio frequency $F_2$, which is modulated in amplitude by a 10,000 cycle subcarrier, the latter in turn being modulated in frequency by a 30 cycle signal provided by a modulation source 3.

The second pattern provided by the standard ODR beacon 1 and its associated antenna array 2 is a rotating directional pattern R, the rate of rotation being equal to 30 per second, and the rotations being controlled by the output of the modulation source 3, so that a definite phase relationship exists between the 30 cycle modulation impressed upon the omni-directional carrier and the rotational phase of the rotary pattern R. We may assume for the purposes of the present discussion that the rotary beam passes through north at the instant that the 30 cycle modulation passes through zero in an ascending direction, although this specific relationship is not essential and any other desired relationship may be substituted therefor.

Aircraft utilizing the standard ODR beacon system are provided with appropriate ODR receivers for receiving transmissions from the ODR beacon 1, and for separating therefrom the 30 cycle omni-directional modulation and a 30 cycle signal derived by detection of the energy in the rotary pattern. At the output of the ODR receiver is provided a phase comparison device which compares the phases of the two modulations and translates the comparison into a visual indication of the bearing of the aircraft from the beacon transmitter. The material relating to the ODR system provided hereinabove represents known practice.

In accordance with the present invention, the output of the modulation source 3 is applied to a frequency multiplier 4 which multiplies the 30 cycle output of the source 3 by a factor of 60, so that there is available at the output of the frequency multiplier 4 a sine wave signal, at a frequency of 1800 cycles per second, which possesses a definite phase relation with respect to the output of the modulation source 3. The 1800 cycle per second output of the frequency modulator 4 is applied to a pulser 5, which generates a single pulse 6 at the precise instant that the sine wave 7 applied thereto passes through zero in an ascending direction. The pulse output 6 of the pulser 5 is applied to synchronize a radar or timing pulse transmitter 8, which transmits extremely short radio frequently pulses T at a frequency $F_1$, the pulse repetition rate of the transmitter 8 being then in our example, 1800 pulses per second. The multiplication factor 60 which has been assumed in the above explanation is an arbitrary figure, and is utilized for the sake of example only. The value selected for the multiplication factor influences, however, the operation of the present system, particularly in respect to the total range which may be measured by the system, and the multiplication factor must accordingly be selected with reference to the total range desired. To a rough approximation, as will be shown as the explanation proceeds, the system of Figure 1, utilizing 1800 pulses per second, has a maximum range of approximately 60 miles.

The timing pulse transmitter 8 actually operates in the present system as a radar pulse transmitter, i. e., one which operates in conjunction with a responder rather than by reflection of signals, the pulses T transmitted by the transmitter 8 being received aboard aircraft for retransmission to a ground station, where the time of transmission is measured and translated into an indication of the range of the remote aircraft. Range indications are provided on the face of a cathode ray tube indicator 10, responded timing pulses being received at the ground station by means of a responded timing pulse receiver 11, operating on a frequency $F_3$. The fact that the pulses transmitted by the timing pulse transmitter 8 are phase related to the transmissions from the ODR beacon transmitter is taken advantage of in the present system to provide a plan position type of indication on the face of the indicator 10, the beam 12 of which is deflected in a suitable manner for the purpose, in a manner now to be described.

The output of the 30 cycle per second modulation source 3 (Fig. 1) is applied to a phase-splitter 13, and the output of the pulser 5 is applied to synchronize a saw-tooth generator 14, the latter having a sweep period $1/1800$ of a second. The outputs of the phase-splitter 13 and of the generator 14 are applied to PPI scan generator 15, the structure, and arrangement and operation of which are well known per se in the radar art, requiring no detailed exposition herein, and the output of which is applied to a PPI scanning yoke 13 associated with the cathode ray tube indicator 10. The beam 12 of the indicator 10 is accordingly caused to rotate angularly at a rate of 30 rotations per second and to provide radial traverses at the rate of 1800 per second, or 60 traverses for each rotation of the beam of the indicator, each traverse being initiated at the instant of transmission of a pulse from the pulse transmitter 8, and the rotation of the beam 12 being synchronized with the output of the modulation source 3 and, consequently with the rotation of the rotary field R of the ODR beacon transmitter 1. The angular position of the cathode ray beam 12 may be pre-adjusted to reach a calibration mark N when the radiated pattern R points due north, and, the beam 12 rotating in synchronism with the pattern R at all times, represents, then, by its angular position the direction of the pattern R at all times. The cathode ray tube 10 is provided with conventional cathode 16, focus and accelerating electrodes conventionally illustrated and identified as 17, and with a beam intensity control electrode 18, the latter being connected to the output of the responded pulse receiver 11. As a further feature, each pulse applied by the pulse receiver 11 to the intensity control electrode 18 of the indicator 10 is also applied to a picture pulse repeater 19, which performs the function of transmitting from the ground, to all aircraft utilizing the present system, signals which may translated at the aircraft into visual indications of the position of the receiving aircraft and of all adjacent aircraft, in both bearing and range, with respect to the ODR beacon 1 and the timing pulse transmitter 8, collectively referred to as "the ground station."

Figure 2 illustrates the arrangement of equipment aboard an aircraft, in accordance with the present invention.

Signals from the ODR beacon 1 are received by means of an ODR receiver 20 which provides as one component of output, by means of a selective circuit 21, a 30 cycle per second signal having a phase which is variable in accordance with the bearing of the receiving aircraft with respect to the ODR beacon and which ultimately derives from the demodulation of the rotating field R provided by the beacon 1. The output of the 30 cycle selective circuit 21 is applied to control the timing of a gating wave 22, generated by the gating wave generator 23, which produces a square pulse having a duration of $1/1800$ second as the input signal 24 thereto passes through zero in an ascending direction. The gating wave 22, then, occurs at times with respect to a $1/30$ second time base interval established by the 30 cycle per second source 3 at the ground station which is determined by the bearing of the aircraft with respect to the ODR beacon 1.

Timing pulses T from the ground transmitter 8 are received aboard each aircraft by means of a timing pulse receiver 25, the output of which is applied to a receiver gate 26, shown separately from the receiver 25, but which may be comprised therein, which is normally closed and which is opened only in response to the gating signal 22. Since the gating signal 22 has a duration of $1/1800$ second, which is precisely the time spacing between the timing pulses T, it will be clear that only one selected timing pulse Ts, of the pulses T received by the timing pulse receiver 25 during each rotation of the beam R, that is, one of every 60 timing pulses T, may coincide with a gating wave 22, and accordingly pass through the receiver gate 26. The selected pulse, Ts, has a time position with respect to an invariable $1/30$ second base time interval, provided by the omni-directional transmissions from the ODR beacon 1, which corresponds with the bearing of the craft.

The output of the receiver gate 26 is applied to trigger a timing pulse responder 30 which transmits on a frequency $F_3$, different from the frequency $F_1$, providing a single pulse of ultra-high frequency energy in response to each triggering pulse provided by the timing pulse receiver 25. The output of the timing pulse responder 30 may be coded, if desired, in accordance with known practice, by means of either an altitude coder 31 or an identity coder 32, or both, the coders 31 and 32 being selectively coupled to the timing pulse responder 30 by means of switches 33 and 34. Suitable coders are available in the art, and are discussed in the text "Radar Beacons" which is No. 3 of the Radiation Laboratory series published by McGraw-Hill Book Company, Inc. in 1947.

Accordingly, the indication provided at the ground station by the cathode ray tube indicator 10 in response to pulses received from the aircraft by the responded timing pulse receiver 11 on the ground, by visual inspection, cerates indications which may be interpreted not only in terms of range and bearing, but may also be interpreted in terms of altitude and identity of the responding craft.

The output of the timing pulse receiver 25 on the craft may be applied to synchronize the oscillations of a saw-tooth generator 35 having a period of oscillation of 1/1800 second. At the output of the ODR receiver 20 may be connected, in parallel with the selective circuit 21 which selects the 30 cycle per second output of variable phase, a further selective circuit 36, which abstracts from the omni-directional pattern provided by the ODR beacon 1 a 30 cycle per second signal having a phase which does not vary as the bearing of the receiving aircraft varies, but which, on the contrary, is constant with bearing. The 30 cycle output of the selective circuit 36 is accordingly identical aboard all the aircraft of the system, except for such slight differences as may be introduced by differences of transmission time due to differences of range of the various craft.

The output of the selective circuit 36 is applied to a phase splitter 37. The output of the phase splitter 37 together with the output of the sawtooth generator 34 are applied to the input of a PPI scan generator 38, which develops at its output currents of such character that when applied to the scanning yoke 39 of a cathode ray tube indicator 40, the beam 41 of the indicator is caused to trace out a PPI pattern having a rotational rate equal to 30 per second, and a radial scanning rate equal to 1800 per second which is synchronized from the timing pulse receiver 25, the phase of rotation of the beams 41 aboard the various aircraft of the system being substantially identical. The cathode ray tube indicator 40 is provided with the normal electrodes for generating a cathode ray beam 41, including a cathode 42, focusing and accelerating electrodes 43, and a beam intensity control electrode 44, which is connected with the output of a picture pulse receiver 45 tuned to a frequency $F_4$, and suitable for receiving signals from the picture pulse repeater 19 at the ground station.

The timing pulses, T, as transmitted by the ground transmitter 8, may be represented in Figure 3 of the drawings by the pulses 50, line $a$ of Figure 3 being intended to represent 60 pulses occurring over a time period commencing at time $t_0$, when the rotary beam R of the ODR beacon 1 points to due north, and extending to a corresponding time $t_0$, the total elapsed time between two times $t_0$ being then 1/30 second. Line $b$ of Figure 3 illustrates the same pulses, now labeled 51, as they are received aboard an aircraft, each pulse having suffered a time elapse $\Delta t$ corresponding with the range of the aircraft from the timing pulse transmitter 8. At line $c$ of Figure 3 is shown a gating wave 52 generated by the gating wave generator 23 (Figure 2) at a time within the 1/30 second time base interval extending between times $t_0$ which is determined by the bearing of a receiving craft. The gating wave 52 permits one of the pulses 51, and specifically that one which is identified by the reference numeral $51a$, to pass through the receiver gate 26 aboard the aircraft and to accomplish a triggering function at the timing pulse responder 30. The responded pulse accordingly leaves the aircraft at a time corresponding with the timing of the specific pulse $51a$, and upon arrival at the ground station is received by the responded timing pulse receiver 11, at a time $2\Delta t$ after the original pulse $50a$, which ultimately gave rise to the pulse 52, had been transmitted from the ground station by the timing pulse transmitter 8. The time difference between pulses $50a$ and 52, which is equal to $2\Delta t$, represents transmission time for electromagnetic energy from ground station to craft, and return to ground, and accordingly is a measure of the range of the craft with respect to the ground station.

It will be recalled that at the ground station all the pulses 50, including the pulse $50a$, initiated a radial scan of the cathode ray beam 12 of the indicator 10 and that the responded pulse 52, when received by the responded timing pulse receiver 11, intensified the beam 12 of the indicator 10, generating a visible spot on the face of the indicator 10. The pulse 52, accordingly, when received at the ground station initiates a visual spot on the face of the indicator 10 which may be read, in terms of appropriate calibrations, as the range in miles of the responding craft. It will further be recalled that the beam 12 of the indicator 10 rotates at the rate of 30 revolutions per second, in synchronism with the rotations of the pattern R provided by the ODR beacon 1, and that the time position of the pulse 52 with respect to the 1/30 second time base interval provided by the rotations of the rotary pattern R represents the bearing of the craft with respect to the beacon 1. Accordingly, the visual indication which is provided in response to the pulse 52 at the indicator 10 has not only a radial position corresponding with range, but also an angular position corresponding with bearing of the aircraft.

The pulse 52 as received by the responded pulse receiver 11 is applied not only to the beam intensifier electrode 17 of the indicator 10, but is also applied to trigger a picture pulse repeater 19 which re-transmits to all aircraft the pulses responded by the various aircraft and received by the receiver 11. The pulses provided by the picture pulse repeater 19 are received aboard the various aircraft by means of picture pulse receivers 44, as has been explained hereinbefore, and provides aboard each aircraft a visual display of the bearings and ranges of all craft in the present system with respect to the ground station, thereby producing aboard each aircraft of the system a visual indication of the relative positions of all other aircraft with respect to that craft in both range and bearing. If the pulses responded by the aircraft have been coded in respect to altitude or identity, or both, by coders 31 and 32, the coding is retained and transmitted by the picture pulse repeater 19 from the ground station to all the aircraft, and the various indications aboard each of the aircraft display the codings and enable each pilot to determine not only the range and the bearing of all adjacent craft but also the altitude and the identities of these craft.

It does not, at first glance, appear that the picture pulses as received at the various aircraft of the present system will be interpretable in terms of ranges and bearings of remote craft, since each craft is at a different range and a different bearing with respect to the ground station and, consequently, the transmissions between the craft and the ground station involve different elapsed times aboard each of the craft. There is accordingly provided a mathematical demonstration that in the present system true ranges and bearings of all aircraft will be received and indicated aboard each of the craft by virtue of the transmissions from the picture pulse repeater 19. Reference is made to Figure 3B of the drawings for a diagram showing two aircraft, A and B, arranged at random ranges and bearings with respect to each other and with respect to the ground station G.

(1) Let a pulse originate at G at time $t_0$.
(2) The pulse arrives at A at time $t_1$ and at B at time $t_1+t_2$, where $t_2$ is proportional to the difference in ranges between A and B.

(3) $t_1$ then equals the time of initiation of a radial sweep at station A, while $t_1+t_2$ equals the time of initiation of a radial sweep at station B.

(4) The responded pulse from station A arrives at G at time $2t_1$.

(5) The responded pulse from B arrives at G at time $2t_1+2t_2$.

(6) From G the pulses are repeated at times $2t$ and $2t_1+2t_2$.

(7) One of the repeated pulses arrives at station A at time $2t_1+t_1$, and the other at time $2t_1+2t_2+t_1$.

(8) The other of the repeated pulses arrives at station A at time $2t_1+t_1+t_2$ and at B at time $2t_1+2t_2+t_1+t_2$.

(9) The total elapsed time of radial scan at station A is from (7) and (3)

$$(2t_1+t_1)=2t_1$$
$$(2t_1+2t_2+t_1)-t_1=2t_1+2t_2$$

These times measure accurately the ranges of stations A and B from G, at station A.

(10) From (8) and (3), the total elapsed time of radial scan at station B is $$(2t_1+t_1+t_2)-(t_1+t_2)=2t_1$$
$$(t2_1+2t_2+t_1+t_2)-(t_1+t_2)=2t_2$$

These times measure accurately the ranges of stations A and B at station B.

It will be noted, if the system of Figures 1 and 2 is analyzed closely, that the maximum range measurement possibility of the system is approximately 60 miles, this range being determined by the pulse repetition rate of timing pulse transmitter 8 in accordance with principles well understood in the field of radar engineering. The pulse repetition rate utilized in our example is relatively arbitrary and may be increased or decreased. An increase of the pulse repetition rate is, however, always accompanied by a decrease in the maximum range. A decrease in the pulse repetition rate, which enables attainment of a greater maximum range, is accompanied by a decrease in the bearing resolution of the system, since one radial scan is provided at the various cathode ray tube indicators of the system in response to each transmitted pulse. In our example, 60 radial lines are provided, which accordingly have an angular separation of six degrees, and this angular separation can only be decreased by increasing the pulse repetition rate, which in turn decreases the range. For many purposes, however, it is desired to have a greater maximum range than 60 miles and also for many purposes, a bearing resolution of six degrees is insufficient.

The solution of the problem presented by the limitations inherent in the simple system exemplified in Figures 1 and 2 revolves about the use of inter-laced pulse timing and inter-laced scanning on the face of the indicators of the system, and a circuit arrangement for accomplishing inter-laced operation is illustrated in Figures 4 and 6 of the drawings, which show respectively a ground station and a station aboard an aircraft, the operation of the system being best explained by reference to the timing diagrams of Figures 5 and 7.

Referring now to Figure 4 of the drawings, there is provided a system which includes an ODR beacon 1, a 30 cycle per second modulation source 3, a frequency multiplier 4 providing a multiplication factor of 1:60, a pulser 5, a timing pulse transmitter 8, a saw-tooth generator 14, a phase splitter 13, a PPI scan generator 15, a cathode ray tube indicator 10, a responded timing pulse receiver 11, and a picture pulse repeater 19, which are identical with the corresponding elements in Figure 1, and which perform indentical functions therewith. There is additionally provided in Figure 4 a commutator 100, having three commutating segments 101, 102, and 103, each extending over an arc of 120° of a circle, the segments 101, 102, and 103, being scanned successively by a rotating contact arm 104, which, in Figure 4, may be assumed to be rotating in a counter-clockwise direction, and which is driven from a motor 105 having a rotational rate of 10 revolutions per second. The motor 105 may be synchronized from the source of 30 cycles per second modulation 3. To the commutator segment 101 is applied the output of the frequency multiplier 4. The same output is applied to a phase-shifter 106 which shifts the phase of the output of the frequency multiplier 4 by 120°; the phase-shifted output of the phase-shifter 106 is applied to the commutator segment 102 and also to the input of a further phase-shifter 107, which serves to introduce an additional phase shift of 120° into the output of the frequency multiplier 4. The phase-shifted output of the phase-shifter 107 is applied to the commutator segment 103. A slip ring and brush, 108, is associated on the rotating contact 104, which provides continuous connection between the latter and the input of the pulser 5. Since the contact arm 104 rotates at the rate of 10 revolutions per second, and since the commutator segments 101, 102, and 103, each have an angular extent of 120°, it will be evident that the contact arm 104 maintains contact with each of the commutator segments 101, 102, and 103, for precisely the time $t_0$ to $t_0$ as illustrated in Figure 3, that is, for precisely one complete rotation of the rotary field R, starting with a northerly orientation thereof as the contact 104 enters into contact with a commutator segment.

Reference is now made to the timing diagram of Figure 5 of the drawings, which illustrates various wave shapes, and their relative timings, as utilized in the system of Figure 4. In particular, the wave 110 represents a sine wave output of the frequency multiplier 4, the wave 111, the output of the phase shifter 106, and the wave 112, the output of the phase shifter 107, these waves being identical in frequency and shape, but different in respect to phasing, succeeding waves having a phase delay of 120° with respect to the preceding waves. Sixty cycles of the wave 110 will be applied to the pulser 5, thereafter 60 cycles of the wave 111, and thereafter again sixty cycles of the wave 112, whereupon the wave 110 will again be introduced to the pulser 5 for sixty cycles, the entire cycle of events repeating itself indefinitely. The pulser 5, as has been explained hereinbefore, generates pulses in response to passage of a sine wave through zero in an ascending direction, these pulses being identified in Figure 5 by the reference numerals 113, 114, and 115, and the pulses 113 being generated in response to the wave 110, the pulses 114 being generated in response to the wave 111, and the pulses 115 being generated in response to the wave 112.

Line D of Figure 5 shows a complete set of pulses as transmitted during three successive time periods of $\frac{1}{30}$ second each. Starting at a time 0 the pulses 113, numbered 1—2—3—4 . . . 60, are transmitted at intervals of $\frac{1}{1800}$ second in response to the wave 110 and correspond with the pulses numbered 113 in line A. After completion of sixty pulses 113, the switch arm 104 makes contact with the commutator segment 102 and a further sequence of sixty pulses 114 is transmitted, each of these having a time phase with respect to the original pulse 113 which is delayed by a time interval of $\frac{1}{5400}$ second. These pulses are identified at line D of Figure 5 by the sequence of numbers 61—62—63 . . . 120. After completion of this sequence of pulses, the switch arm 104 makes contact with the commutator segment 103, connecting the output of the phase shifter 107 to the pulser 5, and effecting generation of a further sequence of sixty pulses, delayed with respect to pulses 114 by time intervals of $\frac{1}{5400}$ second, these pulses being identified at line D by the sequence of numbers 121—122—123 . . . 180.

The transmitted pulses are received aboard the various aircraft of the system, and at each aircraft one of each group of 180 pulses is selected to actuate a pulse responder for retransmission of signals to the ground station, in a manner now to be described. Reference is made to Figure 6 of the drawings, wherein is illustrated in functional block diagram airborne equipment suitable for cooperating with the ground equipment illustrated in Figure 4 of the drawings. The system of Figure 6 is identical with the system of Figure 2, except in one respect, that is, that the gating wave generator 23 of Figure 2 is replaced by a gating wave generator 23a in Figure 6, the latter producing a gating wave having a duration of $\frac{1}{5400}$ second, whereas the gating wave generator 23 of Figure 2 provided a gating wave 22 having a duration of $\frac{1}{1800}$ second duration. The fact that the gating wave provided by the generator 23a extends for a time period of $\frac{1}{5400}$ second enables separation of one only of each group of 180 pulses provided by the ground equipment illustrated in Figure 4, i. e. at the rate of 10 per second, since each of the pulses provided by the ground station occurs somewhere within a time interval of $\frac{1}{5400}$ second. In effect then, narrowing of the gating wave 22a, provided by the gating wave generator 23a, with the pulses interlaced, results in a double gating function, gating being accomplished as between the groups of pulses 113, 114, 115 of Figure 5 and also with respect to one only of the pulses included in the selected group.

Since the elements of the system of Figure 6 duplicate the elements of Figure 2 except in the respect above indicated, identical numerals of reference have been utilized in both figures, except for identification of the gating wave generator 23a and the gating wave 22a, no further detailed description of the system of Figure 6 is provided, reference being made to the preceding description of Figure 2 therefor.

The beam 41 of the cathode ray tube indicator 40 rotates at precisely the same speed and in the same phase in the system of Figures 2 and 6. However, the radial scans in the system of Figure 6 occur at successively displaced angular positions during successive rotations of the beam 41. During transmission of the pulses 113, for example, sixty successive radial sweeps occur at the indicator 40, the radii of these sweeps being angularly separated by six degrees, just as in the system of Figure 2. During the succeeding sweep, however, the transmitted pulses correspond with those identified by the numeral 114 in Figure 5, and arrive at the timing pulse receiver 25 at times delayed with respect to the pulses 113 by a time period of $\frac{1}{5400}$ second, which in terms of rotation of the beam 41 corresponds with angular separations of two degrees with respect to the radial traverses generated in response to the pulses 113.

Referring to Figure 7 of the drawings, radial traverses generated in response to the pulses 113 correspond with those sequentially numbered 1—2—3—4 . . . 60, whereas the traverses generated in response to the pulses 114 correspond with the traverses sequentially numbered 61—62—63 . . . 120.

After completion of the traces 1 to 120, inclusive, the ground station provides a further sequence of sixty pulses, corresponding with the pulses 115 of Figure 5, these pulses being delayed in time phase with respect to the pulses 114 by a time interval of $\frac{1}{5400}$ second, and consequently by an angular extent on the face of the indicator 40 corresponding with an additional two degrees, the positions of the radial traverses being illustrated at 121—122—123 . . . 180. After completion of the latter pulses, the ground station again commences to transmit pulses 113 which are identified at the aircraft with the radial traverses numbered 1—2—3 . . . 60, and the cycle of events repeats.

It will be evident, then, that at the aircraft an interleaved system of radial traverses is generated, the angular separation between successive traverses being two degrees. It will be recalled that the corresponding angular separation in Figure 2 was six degrees.

Correspondingly, at the ground station, the indicator 10 traces out an exactly corresponding pattern having effectively 180 radial lines about the face of the indicator 10.

The timing pulse responder 30 of Figure 6 transmits, then, one pulse for each 180 pulses received by the timing pulse receiver 25 and that pulse corresponds in time position with some point on one only of the radial traverses of the beam 41 of the indicator 40 at the aircraft, and of the beam 12 of the indicator 10 at the ground station, the radial position of the pulse corresponding with the range of the aircraft with respect to the ground station, and the radial sweep line with which the pulse is associated corresponding with the bearing of the aircraft from the ground station.

It will be evident then, that by utilizing the system of Figures 4 and 6, instead of the system of Figures 1 and 2, the angular resolution of the system has been improved by a factor of 3 without any sacrifice of total range which may be measured in the system. It will be clear that still a greater improvement in bearing resolution may be accomplished by providing additional interlacings of the radial sweep, by the simple expedient of utilizing a sufficient number of appropriate phase shifters, such as 106—107 of Figure 4, and correspondingly increasing the number of commutator segments in the switch 100, while further decreasing the duration of the gating waves 23 at the aircraft. It will further be evident that the total range possibilities of the system may be increased, if desired, by decreasing the multiplication factor of the frequency multiplier 4, and that this increase in range will not constitute a limitation on the possible bearing accuracy of the system since bearing accuracy may be increased to any desired degree by selecting an appropriate interlacing pattern of transmitted pulses.

The system as described hereinbefore provides for altitude coding and identity coding, or both, of the pulses transmitted by each aircraft. An extension of the present system, however, envisages gating of the responded pulses at each aircraft in accordance with altitude, and routing of indications at the ground station to different indicators in accordance with the altitude gating at the aircraft, so that aircraft flying in different altitude layers will have their bearings and ranges displayed on different indicators. Alternatively, a corresponding segregation of indications may be accomplished with respect to what may be denominated an identification grouping of aircraft, that is, military aircraft may be provided with one type of gating, commercial aircraft with another and private aircraft with another, etc., and as many such different groupings may be resorted to as may appear necessary or desirable. It will further be clear that a combined system, wherein separations of the visual indications at the ground station may be accomplished both with respect to altitudes of aircraft, and in respect to identification grouping, may be provided by a relatively simple extension of the system first suggested. Such a system is illustrated in Figures 8 and 9 of the drawings, the system of Figure 8 representing a ground station and Figure 9 representing an airborne equipment. The system of Figures 8 and 9 have been illustrated as a modification of the system of Figures 1 and 2. It will be clear, however, that the modification of Figures 1 and 2 which is required to provide the systems of Figures 8 and 9 may be applied equally well to the system of Figures 4 and 6, to enable segregation of indications in accordance with altitude or identification grouping in a system which also provides interlaced pulse transmissions and interlaced radial scan.

Reference is now made specifically to Figure 9 of the drawings, wherein is illustrated a system similar to that of Figure 1 for transmitting directional signals over an ODR beacon and for transmitting omni-directional timing pulse signals over a timing pulse transmitter 8. The ODR transmitter, as has been explained in connection with Figure 1 of the drawings, transmits an omni-directional signal modulated by a 10,000 cycle sub-carrier which is in turn frequency modulated with a 30 cycle modulation for providing a phase reference in the system. The ODR transmitter 1 additionally transmits directionally a rotating pattern of energy, which rotates at 30 R. P. S. Remote aircraft are enabled to determine bearing with respect to the ODR transmitter 1, by comparing the phase of the 30 cycle modulation which is transmitted omni-directionally with the phase of the 30 cycle signal which is generated at the receiver by the rotation of the pattern. The 30 cycle omni-directional modulation is provided by a modulation source 3 which also controls the rotary movement of the rotating pattern. The output of the modulation source 3 is applied to a frequency multiplier 4 which multiplies the 30 cycle output of the source 3 by a factor of 60, the frequency multiplied 1800 cycle per second output of the multiplier 4 being utilized to synchronize a pulser 5 to generate pulses 6 at each passage of the control wave 7 through zero in an ascending direction. The output of the pulser 5, consisting of extremely short pulses having a repetition rate of 1800 per second is applied to a radio frequency transmitter 8 which radiates omni-directionally the pulses of radio frequency energy. The output of the pulser 5 is additionally utilized to synchronize a sawtooth generator 14, which provides output waves 14a of sawtooth character having each a duration of 1/1800 second. The output of the modulating source 3 is applied to a phase splitter 13, the output of which, together with the sawtooth output of the generator 14, is applied to a PPI scan generator 15 for generating currents adapted, when applied to the PPI scanning yoke 13 of the CRT indicator 10, to cause the beam 12 of the indicator 10 to deflect in accordance with a conventional PPI pattern. The system as so far described corresponds precisely with the system of Figure 1, and accordingly requires no further extended exposition at this point. In accordance with the modification of my invention introduced into Figure 9, a timing motor 200 is provided which rotates at a relatively slow rate, which for the sake of example may be taken as one revolution per second. The motor is utilized to control a source of synchronizing signals 201, which generates short pulses S of radiant energy at one second intervals, the pulses S being transmitted omni-directionally over an antenna 202.

The motor 200 additionally drives the rotating contact arm 203 of a commutator switch 204 having thirty commutating segments 205. Thirty CRT indicators 206 are provided, each having an intensity grid 207 and the usual cathode 208 and beam forming electrodes 209. The beams 210 of the cathode ray tube indicators 206 are controlled by scanning yokes 211 to which are applied, in parallel, the output of the PPI scan generator 15 so that all the indicators 206 are caused to trace out identical PPI patterns on the faces of the indicators 206. To the rotating arm 203 of the commutator switch 204 is connected the output of a timing pulse receiver 11, that output being also applied to a picture pulse repeater 19. The pulse receiver 11 and the pulse receiver 19 performing identical functions in the system of Figure 9 and in the system of Figure 1.

It will now be appreciated that signals received by the pulse receiver 11 during successive time increments of $1/30$ second, there being 30 commutator segments 205 and the contact arm 203 rotating at 1 R. P. S., will be applied to different ones of the CRT indicators 206 so that the incoming signals at the pulse receiver 11 are distributed among the indicators 206 on a time-sharing basis.

Turning now to Figure 8 of the drawings, wherein is illustrated an airborne system adapted to cooperate with the ground equipment illustrated in Figure 9, there is provided an ODR receiver 20 for receiving ODR beacon signals on frequency $F_2$ from the ODR beacon 1 of Figure 9. In the output of ODR receiver 20 is provided a 30 cycle selective filter network 21 for abstracting from the receiver output a 30 cycle signal variable in accordance with the bearing of the aircraft with respect to the beacon 1. The output of the filter 21 is applied to synchronize a gating wave generator 23 for generating a gating wave 22 each time that the sine-wave output of the selective filter 21 passes through zero in an ascending direction. The output of the gating wave generator 23 is applied to gate open a normally closed receiver gate 26 which is in series with the pulse receiver 25, or forms part thereof. The pulse receiver 25 is tuned to a frequency $F_1$ suitable for receiving timing pulses from the timing pulse transmitter 8 on the ground. Since the timing pulses occur at the rate of 1800 per second, and the gating wave extends for a period of $1/1800$ second, one only of each 60 pulses received by the timing pulse receiver 25, during each cycle of rotation of the rotating beacon pattern R, will be available at the output of receiver gate 26, and that pulse will have a time position with respect to the $1/30$ second time base interval established by the rotations of the pattern R which is determinative of the bearing of the receiving craft with respect to the beacon 1.

The system of Figure 8 as described to this point is identical with the system illustrated in Figure 2. In the embodiment of the invention illustrated in Figure 2 of the drawings, the output of the receiver gate 26 is applied to a timing pulse responder 30, which transmits in response to pulse applied thereto on a frequency $F_3$ all pulses available at the output of the receiver gate 26. In the system of Figure 8, on the other hand, this is not true, an additional gating function being performed in the following manner. A synchronizing signal receiver 220 is provided aboard each aircraft for receiving synchronized signals provided at the rate of one per second by the source 201 at the ground station. The sync. signals received by the receiver 220 are applied to control the operation of a gating wave generator 221 which is adapted to provide in its output gating waves 222 having each a duration of $1/30$ second, somewhere within each one second time interval established by the sync. signal 220. The time position of the gating wave 222 with respect to the base time interval established by the sync. signal receiver 220 is determined by an altitude responsive device 223 or by an identification grouping device 224, or gating waves may be provided in response to both an operator aboard the aircraft may be enabled to connect either the altitude responsive device 223 or the identification grouping device 224 in operative relation with the generator 221, by suitable manipulation of the switches 225 and 226. The gating wave 222 is applied to control a normally closed receiver gate 227, which is in series with the receiver gate 26, permitting passage through the gate 226 of selected ones only of the pulses provided by the receiver gate 26, selection being accomplished, accordingly, in accordance with the altitude or identification grouping of the aircraft involved, or both. It will be recalled that at the output of receiver gate 26 are available pulses having a repetition rate of 30 per second, and a time separation of $1/30$ second, and a time position or phase with respect to a basic time interval of $1/30$ second established by the ODR beacon 1, determined in accordance with the bearing of the receiving craft from the ODR beacon 1. The receiving gate 227 suppresses certain of the pulses during each period of one second, so that at the output of the receiver gate 227 are provided pulses having the time positions of the incoming pulses, and consequently being interpretable in terms of bearing of the aircraft, the pulse pattern being, however, utilized by the suppression of certain pulses in a manner which is indicative of aircraft altitude or identification grouping, or both. Since the input pulses occur at the rate of 30 per second and the gate 227 suppresses pulses during a major portion of each one second interval, it will be evident that at the output of the receiver gate 227 will occur groups of pulses, pulses of each group being separated by time intervals of an integral multiple of $1/30$ second, and the groups of pulses recurring at time intervals of one second. The time position of pulses with respect to the one second time interval established by the sync. signals receiver 220, i. e. within each group of pulses, corresponds accordingly with altitude or identification grouping or both.

The output of the receiver gate 227 may be applied to the pulse responder 30 to control transmission of pulses to the ground station on a frequency $F_3$. The remaining elements of Figure 8 of the drawings correspond precisely with corresponding elements in Figure 2 of the drawings and have been identically numbered. Reference may be made to the description of Figure 2 for a complete exposition of the operation of the remaining elements of Figure 8, a repetition of the exposition being deemed unnecessary.

Returning now to the ground station as illustrated in Figure 9, pulses received by the pulse receiver 204 are selectively routed to the CRT indicators 206 by the commutating switch 204. The pulses from any craft occur only during contact of the switch arm 203 with one of the commutator segments 205, since the contact arm 203 remains in contact with one of the commutator segments 205 during any given $1/30$ second time interval of the 30 such intervals available between sync. pulses provided by the sync. signal source 201. The responded pulses available from the craft likewise occur during one $1/30$ second interval only of the 30 such intervals available during the total one second interval established by the signal receiver 220. Accordingly, aircraft flying at different altitudes will have their respondent pulses routed to different ones of the indicators 206, and the indications at the ground station will be accordingly segregated on the faces of different ones of the indicators 206 in accordance with the altitude. Likewise certain of the indicators 206 may be allocated to identification grouping, together with certain of the $1/30$ second time intervals established during each basic one second interval existing between sync. signals S.

For the sake of example, it is suggested that the first twenty of the thirty available time sharing channels be allocated to altitude and the remaining ten to identification. This permits segregation of signals in twenty layers of altitude, and if a total range of 10,000 ft. is to be monitored, a different presentation may be provided for each 500 ft. of altitude. Likewise, ten different classes of aircraft may be grouped separately and their plan positions indicated on separate indicators. Suggested groupings for aircraft are: Navy craft, Army craft, jet propelled craft, commercial craft, private craft, transcontinental craft, special clearance craft, etc.

Reference is now made to Figure 10 of the drawings wherein is illustrated in detail the arrangement of the gating wave generator 221 of Figure 8, which provides two sets of gating waves to the receiver gate 227, one of the gating waves corresponding in time position with altitude of the craft involved, and the time position of the other gating wave corresponding with an identification grouping which may be manually preselected.

The sync. signals S occurring at intervals of one second which are received by the signal receiver 220 from the sync. signal source 201 at the ground station are applied in parallel to a pair of square wave generators 250 and 251. The square wave generator 250 is manually adjustable to provide a square wave 252 having a duration extending from the time of receiving one of the pulses S for an interval variable over the range ⅔ of a second to one second. The minimum adjustment of the square wave generator provides for generation of a pulse having a duration ⅔ of a second, the duration of the pulses being controllable by setting of the manual selector 253, which is positionable against a calibrated dial 254, each of the calibrations 255 of which corresponds with an identification grouping pertaining to aircraft. The output of the square wave generator 250 is applied to a differentiator 256 which provides at its output sharp pulses 257 of positive polarity in response to cessation of pulses 252, these being applied to the gating pulse generator 258, which, in turn, generates gating pulses 259 having each a duration of 1/30 second, for application to the receiver gate 227. Accordingly each of the gating pulses 259 occurs sometime during the last ⅓ of the interval, the boundaries of which are defined by the sync. pulses S, the precise position of each pulse 259 being determined by the manual control 253 so that the time position of the pulse represents an identification grouping pertaining to aircraft.

The square wave generator 251 generates square waves, in response to sync. pulses S, which have durations extending from substantially zero time to a time interval equal to ⅔ second. The duration of the output wave 260 of the square wave generator 251 is determined automatically by means of an aneroid cell 261 so that the duration of the wave 260 is directly proportional to the altitude of craft involved. Should the craft be at sea level, the square wave 260 may have an extremely short duration, i. e., several microseconds. On the other hand, for altitudes of 10,000 feet, assuming that altitude to be the maximum altitude within which aircraft operation is desired, the wave 260 may have a duration of ⅔ second. The output wave 261 of the square wave generator 251 is applied to a differentiator 262, which provides at its output a positive pulse 263 in response to cessation of the gating wave 260. The pulse 263 is applied to a gating pulse generator 264, which generates in response thereto a gating pulse 265 having a duration of 1/30 second, the time position of the gating pulse 265 corresponding with the altitude of the aircraft. The output of the gating pulse generator 264 is applied over a lead 265 to receiver gate 227.

It will be clear, accordingly, that there is applied to the receiver gate 227 each one second time interval established by the sync. pulses S a pair of gating pulses 265 and 259, which occur in time succession. The gating pulse 265 represents, by its time position in the one second time interval, altitude of the transmitting craft, and the gating pulse 259 represents by its position in the last ⅓ of the one second time interval, identification grouping of the draft.

To provide a specific example, if a Navy craft were flying at 5,000 feet, the gating pulse 265 would have a time position commencing ⅓ of a second after each sync. pulse S and the gating pulse 259 would have a time position commencing at 23/30 of a second after the sync. pulse S, the altitude of 5,000 feet corresponding with ten layers of 500 feet each and each successive layer corresponding with a gating pulse position which is advanced by 1/30 of a second, and the manual position of the control 253 when set to indicate a Navy craft corresponding with the third division on the scale 254.

The gating pulses 259 and 265, as has been explained hereinbefore, each selects one of the pulses available at the output of the receiver gate 29 during each one second time interval, causing the pulse responder to transmit two pulses during each second, the selected pulses having time positions corresponding with the time positions of the gating pulses.

It will be clear from the preceding discussion that the timing of the sync. pulses S must be properly synchronized with respect to the 30 cycle modulation source 3 so that sync. pulses S will occur at the beginning of each cycle of output of the source 3, the latter time being a starting point for many of the timing operations of the system. Accordingly, there is provided an interlock 270 between the 30 cycle modulation source 3 and the sync. signal source 201, the output of the latter preferably being controlled by frequency multiplication from the output of the sync. signal source 201.

In the various modifications of the invention hereinbefore described a specific arrangement of timing pulse receiver 25 and timing pulse responder 30 has been adopted with respect to the various gates utilized. Specifically, in Figure 2 of the drawings, a single receiver gate 26 separates the timing pulse receiver 25 and the timing pulse responder 30, while in the embodiment illustrated in Figure 8 of the drawings a receiver gate 26 which gates in respect to azimuth and a further receiver gate 227 which gates in respect to identification grouping and altitude separates the receiver 25 and the responder 30.

The specific arrangement shown is by no means essential and various other groupings of these elements may be adopted, one of which is illustrated in Figure 13 of the drawings. In Figure 13, the pulses received aboard an aircraft are passed through the azimuth gate 26 and the elevation and identification grouping gate 227, in series, prior to application to the timing pulse receiver 25, so that only those pulses are applied to the receiver 25 which are intended to be transponded by the responder 30. This arrangement permits utilization of a conventional type of radar transponder aboard the aircraft, gating of the responses being controlled by equipment which is external to, and separate and apart from, the transponder itself.

The C. A. A. has determined that range measuring equipment shall be standard aboard certain types of aircraft, the particular type of equipment selected being known as DME. These letters form an abbreviation for the expression "distance measuring equipment." The DME equipment provides an interrogator aboard each aircraft and a responder at a ground station, the interrogator being pulsed at a random rate and the associated receiver being gated in respect to its own range from the responder so that only those pulses originating aboard a particular craft are enabled to produce distance indications or measurements aboard that craft. Pulses originating aboard remote craft occur at a random rate with respect to those transmitted from the local craft and accordingly fall within the receiver gate only at rare intervals and produce effects on the DME indicator sometimes in such sense as to reduce, and sometimes to increase, the range reading, so that in the average, their effect cancels. In the present system, the responder 30 may be considered for all purposes as the interrogator of a DME equipment and the picture pulse receiver 44 may be considered likewise to be the receiver of a DME equipment.

While transmissions from the responder 30 do not occur at random, so that in this respect the equipment of the present invention does not precisely parallel in its operation a DME equipment, the pulses responded by the responder 30 aboard a given craft, occur at times which are not identical, over long periods of time, with the pulses originating aboard remote craft, since two craft will transmit pulses at identical times only if they have identical positions. Accordingly, the responder 30 is effectively equivalent to a DME interrogator in that the pulse transmissions therefrom occur at times identifiable with the transmitting responder and not with any other responder.

In order to carry further the parallel between the equipment of the present invention and the DME system, a range gate 450 may be provided in the present system to the input of which may be connected the output of the picture pulse receiver 44, and the output of a trigger circuit 25A which is responsive to timing pulses provided by receiver 25. The range gate opens at times following triggering of the circuit 25A which are determined by the range of the measuring craft in response to controlled pulses provided by the picture pulse receiver 44. The output of the range gate 450 may be channeled to a range meter 451, which reads range of the local craft directly in terms of a pointer setting, so that recourse need not be had to interpreting indications on the face of a CRT indicator in order to determine local range. The range gate excludes from the meter 451 all pulses received by the picture pulse receiver 44 except those which occur at times corresponding with the range of the aircraft.

The parallel between the equipment of the present system and of the DME system is, accordingly close, and the DME and the present systems operate similarly for all practical purposes.

In the various airborne equipments described hereinabove, the range and bearing indication of a local aircraft is not distinguishable from a remote aircraft. This is undesirable since an air navigator provided with a PPI display is unable to determine therefrom which of a plurality of indications arises by virtue of his own craft's position and which relate to remote craft. Accordingly, I have provided means for identifying the bearing of the local craft on the face of the cathode ray tube indicator on each of the craft. The pilot thereby is enabled to select the indication corresponding with his own craft's position in respect to bearing, but not in respect to range. It is however, felt that a means of identifying local range is unnecessary in general and that the added complications which would be introduced into the present system, were such a feature added thereto, would be unjustifiable economically. A pilot who is provided with a definite indication of his own bearing need not remain uncertain as to which of a plurality of craft on the same bearing, but having different ranges, is his own. It will usually be the case that the pilot will have at least an approximate knowledge of his own range and will be enabled to select the indication corresponding with his own craft in this manner. Additionally, of course, provision has been made for coding indications in accordance with altitude as by the altitude coder 31 and in accordance with identity as by the identity coder 32. Accordingly, a pilot who is uncertain as to which of a plurality of craft flying on a given bearing, but at different ranges, corresponds with his own craft or position, has only to close the switch 34 (Figure 2) whereupon indications relating to his own craft will be coded in such manner as to enable ready recognition.

For the purpose of providing bearing identification, I have utilized the output of the receiver gate 26 aboard each of the aircraft to initiate generation of a square wave having a duration of $\frac{1}{1800}$ second, applying the square wave to the intensifier grid 44 of the CRT 40. Since the output of the receiver gate 26 occurs during one only of the radial sweeps of the beam 41 of the indicator 40, that sweep occurring in an angular position corresponding with the bearing of the craft with respect to the ODR beacon 1, and since each radial face of the beam 41 occupies a time of $\frac{1}{1800}$ second, the output of the square wave generator extends for a time precisely superimposed upon the time occupied by the radial trace corresponding with the bearing of the local craft. The output of the square wave generator may be made of relatively low amplitude as compared with the normal output of the picture pulse receiver 44, to avoid masking the indications provided by the latter. There is thus provided a radial line on the face of the indicator 40 aboard each craft which represents by its angular position the bearing of the craft and enables the air navigator to determine his own bearing and to identify the visual indications corresponding with the position of his own craft.

While I have described various embodiments of my invention, it will be realized that rearrangements of the apparatus and modifications of its details may be resorted to without departing from the true scope of the present invention and of its various features.

In the various modifications of the present system as hereinbefore described, and illustrated in Figures 1 to 10 of the drawings, the assumption has been made that all aircraft in a given vicinity will receive ODR beacon signals, from a single ODR beacon and will transmit pulses to, and receive pulses from, a single ground station. In an integrated beacon system, which may cover the entire country with adjacent beacons, this is not necessarily true, since various aircraft may be flying within the fields of two ODR beacons simultaneously and may interrogate two ground timing pulse responders simultaneously, and since picture pulses may be received aboard an aircraft synchronized with respect to one ODR beacon, the picture pulses originating at another. The suggested conditions, as well as others not suggested, may result in the condition that indications received at ground stations and aboard aircraft will become completely meaningless.

I propose accordingly that all pulse transmitters in a given area, and which may operate on a common radio frequency, be caused to operate on a time-sharing basis, whereby to prevent any possibility of simultaneous operation of equipment aboard an aircraft in response to signals from two or more pulse transmitters simultaneously. I have shown in Figure 11 of the drawings five ground stations, A, B, C, D and E, distributed over a relatively wide area, and which for the sake of argument may be assumed to be geographically distributed either at random or along a predetermined airway, the beacon stations of which operate on respectively different carrier frequencies $F_{10} \ldots F_{14}$, but the pulse transmitters of which all operate on a common radio frequency, so that transmissions therefrom are not normally separable aboard aircraft. I provide a source of sync signals having a pulse repetition rate of one per second, from any convenient source, and preferably the sync signal source 201. The sync signals may be received on the ground by a sync pulse receiver 300 which serves to operate a stepping switch 301, having a stepping arm 302 and a number of contacts 303, one for each of the timing pulse and picture pulse stations which are to be controlled, so that transmissions from any one may be received without interference from any other. The arm 302 may be connected with a source of potential 304, successively applying said potential to the switch points 303 at intervals of one second. Each of the switch points 303 is connected by means of suitable cable 305, with one of the pulse timers and picture pulse transmitters of the ground stations, A, B, C, D, and E. The switch points 303 associated with the stations A, B, C, D, and E may be distinguished by the reference letters $a$, $b$, $c$, $d$, $e$ respectively.

Accordingly, when the switch arm 302 contacts the switch point 303, switching potential is transferred to the pulse transmitters 8, 19, of the station A and turns the latter on, causing same to operate for one full second. At the end of the second, a sync pulse is received by the receiver 300, causing a stepping operation of the switch 301, the arm 302 transferring to the switch contact 303$b$, whereupon the pulse transmitters 8 and 19 of station A becomes de-energized and energy is transferred to the station B, the pulse transmitters 8 and 19 of which proceed in turn to transmit for a period of one full second. At the end of the latter second the switch 402 steps one further position, contacting the point 303 and energizing the station C. In this manner the stations A, B, C, D and E are caused to transmit timing pulse and picture pulse signals in time succession, or on a time-sharing basis, the total time of operation of each of the stations being one full second, after which a succeeding station takes over.

It is essential, aboard the aircraft, that operation take place with respect to one only of the stations A, B, C, D and E and that the pilot or navigator of the aircraft know at all times, which of the stations is providing him with bearing and range information, and, preferably be enabled to select the station. Further, it is essential that the airborne receiver aboard an aircraft respond to timing pulses from one ground station only, and receive signals indicative of ranges and bearings of remote craft, which are measured and synchronized with respect to one ground station only, and it is desirable that the identity of this station be selectable by the operator of the craft, both in respect to its ODR frequency channel and its pulse signal time allocated channel, simultaneously and in a single operation.

There is accordingly provided aboard each aircraft utilizing the system a mechanism for establishing reception from the pulse transmitters of stations A, B, C, D and E on a time-sharing basis, and for suppressing pulse signals received from all but a selected one of the stations.

Briefly described, the mechanism referred to in the previous paragraph consists of a commutator 400 having any desired number of segments but which in my example must be at least five, since five stations are involved, and selection must be accomplished therebetween. The commutator has a rotating switch arm, driven by means of a motor 403, at such speed that the switch arm 402 remains in contact with each commutator segment during a full one second time interval, corresponding precisely with the one second time interval during which operates one of the stations A, B, C, D or E. The motor may be synchronized from the output of a signal receiver 404 which receives sync pulses from a remote source, as 201 (Fig. 9), these pulses being precisely those which are likewise received by the sync pulse receiver 300 and which determine the times of operation of the timing pulse and picture pulse transmitters, 8 and 19.

Further associated with the commutator is a manually positionable contact arm 405, which may be manually positioned to make contact with any one of the commutator segments.

Antennae A1 and A2 associated respectively with the timing pulse receiver 11, and the antenna associated with the picture pulse receiver 19, located aboard any of the various aircraft utilizing the systems, and referred to in the various modifications of the inventions hereinbefore described and illustrated, are connected with their outputs in parallel with the rotating arm 406 of the commutator 400. As the pulsers 8 and 19 at each ground station come into operation, the timing pulses provided by that ground station are intercepted by appropriate antennae A1 and A2 and applied by the rotating switch arm 402 to a commutator segment 401, one segment being allocated to each one of the ground stations on a time sharing basis. Since one only of the commutator segments 401 is connected at any one time, by the manually positionable switch arm 405, only one beacon may be received aboard any one craft. To the manually positionable switch arm 405 may be connected an output lead for transferring signals from the commutator to the analyzing and indicating equipment, including receivers 25 and 45 aboard the aircraft. Accordingly signals from that one only of the ground stations A, B, C, D and E, which corresponds with the selected position of the manually positionable switch arm will provide reference signals and timing pulses to the aircraft's equipment, which may be repeated to the ground station, and there translated into indication of range and bearing of the craft.

Communication is accordingly established between a selected craft and a selected ground station on a time-sharing basis, each of the ground stations being assigned a channel, on a time-sharing basis, and the aircraft being enabled to select any one of the time-shared channels, for communication with the desired ground station.

The manually positionable arm 406 may be coupled with the tuning condenser 20C of the ODR receiver 20 aboard each craft, so that selection of a commutator segment 401 corresponding with one of ground stations A, B, C, D, E, by switch arm 405, is accompanied automatically and simultaneously by channel or frequency selection of the ODR beacon at the corresponding ground station. To enable the stated operation, it is, of course, essential that the frequency channels of the ODR beacons and the time divided channels of the pulse transmitters be caused to correspond throughout the entire country.

In the system as above described, range, bearing, identity and altitude indications relating to any given aircraft will be provided from only one ground station, and aboard that aircraft only at intervals instead of continuously. However, the intervals may be maintained of fairly short duration, five seconds in my example, which is adequate for all practical purposes.

Long persistence tubes may be employed at the various viewing stations aboard the various aircraft and at the ground stations, to provide continuously visible indications, the visible images persisting on the faces of the indicators in the interim between signals.

In the foregoing descriptions of various embodiments of the present invention, and in the drawings, reference has been made to radial range measuring traces on the faces of the various cathode ray tube indicators. Upon close consideration of the operation of the indicators, and the theory of operation of the system, it will be evident that the so-called radial traces are actually slightly curvilinear rather than accurately radial, and are radial to a first approximation only. Such is the case in all PPI presentations in radar systems, as a matter of fact, due to the fact that the antenna of a radar system having a rotating antenna suffers a finite angular displacement during travel of a pulse of energy to a target and return, so that targets on precisely the same bearing, but at different ranges, are displayed on slightly different bearings. In the system of my invention this effect is accentuated, as compared with the effect in conventional radar systems, due to the relatively rapid change of bearing with time in the present system, and, in fact, in the example provided hereinabove, wherein 1800 pulses are transmitted per second, the rotational rate of the directional beam of the ODR beacon being thirty per second, the angular deviation of radial traces on the faces of the indicators of the system is 6°. While the effect noted is present in the system, it does not, in practice, introduce complications or inaccuracies into the system, since ranges may be measured by comparison with curvilinear calibration markings on the face of the indicator. As the pulse repetition rate utilized in the system is decreased, of course, the effect described also decreases in magnitude.

Accordingly, it will be understood that where the terms "radial scan" or "radial sweep," or the like, are utilized in the specification and claims, to describe the substantially but not truly radial motions of the cathode ray beams of the cathode ray tube indicators of the system, it is intended to include within the scope of the terms, scans or sweeps having substantial curvilinearity, the precise extent of which is, in fact, determined by the pulse repetition rate of the system.

While I have described and illustrated various specific modifications and arrangements of my invention, it will be evident to those skilled in the art that rearrangements and modifications of the specific systems illustrated and described may be devised which do not, however, depart from the true spirit and scope of the invention as defined in the appended claims.

What I claim and desire to secure by Letters Patent of the United States is:

1. In a navigational system, means for transmitting repetitive timing pulses from a first station to a second station, means for transmitting a rotative pattern of energy from said first station to said second station, means for establishing a predetermined time relation between the rotations of said pattern and the transmissions of said pulses, means at said second station for receiving said pulses and said energy, said energy as received having amplitude modulation produced by the rotation of said pattern, means responsive to said modulation for selecting certain of said received pulses only, and means for transmitting from said second station pulses timed in response only to said certain of said pulses.

2. In a navigational system, means for transmitting a rotating pattern of energy at a predetermined rotative frequency and in a predetermined phase, cathode ray means having a cathode ray beam, means for rotating said beam in synchronism with the rotation of said rotating pattern, means for transmitting a plurality of pulses in addition to said rotating pattern of energy during each rotation of said rotating pattern of energy at times having directional significance, means aboard a remote craft for repeating selected ones of said pulses, means aboard said craft for selecting said selected ones of said pulses for repeating in response to the phase of said rotative pattern as viewed at said craft, means connected with said cathode ray means for receiving repeated pulses and for modulating said beam in response to reception of each repeated pulse, whereby the angular position of a visible indication at said cathode ray means is indicative of the bearing of said craft with respect to said means for transmitting.

3. The combination in accordance with claim 2 wherein means are provided coupled with said cathode ray means for radially displacing said beam in synchronism with transmission of said first mentioned pulses, to render said visible indication representative of both bearing and range of said craft with respect to said means for transmitting.

4. The combination in accordance with claim 2 wherein is further provided aboard said craft a further cathode ray means having a cathode ray beam, means for rotating said cathode ray beam of said further cathode ray means in substantial synchronism and pattern with said first mentioned cathode ray beam, means for further repeating said repeated pulses to said craft, means aboard said craft for receiving said further repeated pulses, and means responsive to reception aboard said craft of said further repeated pulses for modulating the cathode ray beam of said further cathode ray means, whereby to repeat at said further cathode ray means bearing indications present at said first-mentioned cathode ray means.

5. The combination in accordance with claim 2 wherein means are provided coupled with said cathode ray means for radially displacing said beam in synchronism with said pulse transmissions, whereby said visible indication is representative of both bearing and range of said craft with respect to said means for transmitting, and wherein is further provided aboard said craft a further cathode ray means having a further cathode ray beam, means for rotating said further cathode ray beam in substantial synchronism with said first-mentioned cathode ray beam, means for radially displacing said further cathode ray beam in synchronism with reception of said transmitted pulses, means for further repeating said repeated pulses to said craft, means aboard said craft for receiving said further repeated pulses, means responsive to reception aboard said craft of said further repeated pulses for modulating said further cathode ray beam, whereby to repeat at said further cathode ray means range and bearing indications present at said first-mentioned cathode ray means.

6. In a navigational system for providing range and bearing information concerning each of a plurality of craft to the plurality of craft, means at a ground station for transmitting pulses omni-directionally, means aboard each of said plurality of craft for retransmitting selected ones only of said pulses to said ground station said last means comprising means for selecting said pulses for retransmission aboard each of said craft in accordance with the value of at least one quantity having navigational significance as measured aboard said craft, means for further retransmitting said last mentioned pulses, when received at said ground station, to all said craft, and means aboard each of said craft responsive to the retransmitted pulses for indicating ranges and bearings of all of said craft with respect to said ground station.

7. In a navigational system for providing range, bearing and altitude information from a craft to a ground station, means for transmitting from said ground station a signal interpretable aboard said craft in terms of the bearing of said craft relative to said ground station, means for transmitting omni-directionally from said ground station groups of pulses synchronized with said signals and additionally to said signals, means aboard said craft for re-transmitting to said ground station selected ones of said pulses, means for selecting said selected ones of said pulses in response to said signals and to the measured altitude of said craft, means for receiving said selected ones of said pulses at said ground station, and means for translating said selected ones of said pulses into a visual display of the range, bearing and altitude of said craft at said ground station.

8. In a navigational system for providing range, bearing and altitude information from a craft to a plurality of further craft, means for transmitting from a ground station to said plurality of craft signals interpretable aboard each of said plurality of craft in terms of the bearing of the craft relative to the ground station, means for transmitting omni-directionally from said ground station groups of pulses synchronized with said signals and additional to said signals, means aboard each craft for re-transmitting to said ground station selected ones only of said pulses, said last means comprising means for providing selection of said pulses in response to bearing of each craft as determined from said signals and further in accordance with the measured altitude of each craft, means at said ground station for receiving said selected and re-transmitted pulses, and means for translating the received pulses into a visual display of the range, bearing and altitude of each of said plurality of craft.

9. In a navigational system, means for transmitting omni-directional beacon signals comprising an alternating current signal having a phase variable with bearing from which said beacon signals are received, means for transmitting omni-directionally a group of repetitive pulses within each cycle of said alternating current signal, means for receiving said pulses and said alternating current signal at a remote location, means at said remote location responsive to the phase of said received alternating current signal for selecting at least one of each group of pulses, means for further selecting predetermined ones only of the selected pulses, and means for transmitting the further selected pulses.

10. The combination in accordance with claim 9 wherein is provided means for receiving said transmitted further selected pulses and for translating said further selected pulses into an indication of range and bearing of said remote location.

11. A radar system comprising means at a station for transmitting omni-directionally pulses of radiant energy, means at said station for transmitting an auxiliary rotating directional pattern of radiant energy in addition to said pulses, and means at said station responsive to said pulses and said last mentioned energy jointly for determining direction and range of a remote object.

12. In combination, means for transmitting a rotating pattern of radiant energy at a predetermined rotational rate, said first mentioned means comprising a source of alternating current having a frequency corresponding with said rotational rate, means for multiplying said frequency by a constant factor, to provide a frequency multiplied alternating voltage, and means responsive to each cycle of said frequency multiplied alternating voltage to transmit a pulse.

13. In combination, means for transmitting a rotating pattern of radiant energy at a predetermined rotational rate, said first mentioned means comprising a source of alternating voltage having a frequency corresponding with said rotational rate, means for multiplying said frequency by a constant factor to provide a frequency multiplied alternating voltage, means responsive to each cycle of said frequency multiplied alternating voltage to transmit a radiant energy pulse, a cathode ray tube indicator having means for generating a beam of electrons, means for deflecting said beam of electrons in a circular sweep at the frequency of said first mentioned alternating voltage, and means for deflecting said beam of electrons in radial sweeps in synchronism with said radiant energy pulses.

14. In a position reporting system, means for generating aboard each of a plurality of aircraft a sequence of pulses, means for suppressing certain of said pulses aboard each of said aircraft in accordance with altitude of said aircraft, means for suppressing further of said pulses aboard each of said aircraft in accordance with identification of said aircraft, and remote means for indicating altitude and identification of each of said aircraft in response to the unsuppressed ones of said pulses.

15. In a telemetric system, means for transmitting omnidirectional pulses from a first station to a plurality of further stations, means at each of said further stations for repeating only selected ones of said pulses omni-directionally to said first station, said last means at each of said further stations comprising each means for selecting pulses for repeating in accordance with the magnitude of a measurable quantity, and means responsive to the pulses selected by said means for selecting for transmitting to all said further stations signals representative of said magnitudes of all said quantities.

16. A radar system comprising means for transmitting pulses of radiant energy to a remote device, means for transmitting auxiliary signals having directional significance in addition to said pulses to said remote device, means at some remote device for modulating said pulses in response to said auxiliary signals in accordance with the direction of said remote device, means for re-transmitting said modulated pulses from said remote device, and means for receiving said modulated pulses and determining therefrom the direction and range of said remote device.

17. In a radar system, means for transmitting a predetermined succession of pulses of radiant energy to a remote object, means for transmitting bearing significant signals to said remote object in addition to said pulses, means at said remote object for repeating all said pulses except one, said last means comprising means at said remote object responsive to said direction significant signals to select said one pulse in accordance with bearing of said remote object, and means responsive to the repeated pulses for indicating range and bearing of said remote object.

MARCEL WALLACE.

References Cited in the file of this patent

UNITED STATES PATENTS

| Number | Name | Date |
|---|---|---|
| 2,403,527 | Hershberger | July 9, 1946 |
| 2,405,930 | Goldberg | Aug. 13, 1946 |
| 2,412,670 | Epstein | Dec. 17, 1946 |
| 2,421,017 | Deloraine | May 27, 1947 |
| 2,433,341 | Busignies | Dec. 30, 1947 |
| 2,433,381 | Marchand | Dec. 30, 1947 |
| 2,441,956 | Deloraine | May 25, 1948 |
| 2,444,452 | Labin | July 6, 1948 |
| 2,448,016 | Busignies | Aug. 31, 1948 |
| 2,453,970 | Charrier | Nov. 16, 1948 |
| 2,459,482 | Bond | Jan. 18, 1949 |
| 2,468,045 | Deloraine | Apr. 26, 1949 |
| 2,470,939 | Miller | May 24, 1949 |
| 2,471,416 | Deloraine | May 31, 1949 |
| 2,480,068 | Wolff | Aug. 23, 1949 |
| 2,480,123 | Deloraine | Aug. 30, 1949 |
| 2,483,097 | McIlwain | Sept. 27, 1949 |
| 2,490,268 | Herbst | Dec. 6, 1949 |
| 2,499,225 | Marshall | Feb. 28, 1950 |
| 2,502,317 | Ewing | Mar. 28, 1950 |
| 2,513,282 | Busignies | July 4, 1950 |
| 2,517,540 | Busignies | Aug. 8, 1950 |
| 2,517,752 | Wolff | Aug. 8, 1950 |
| 2,520,595 | Fernsler | Aug. 29, 1950 |
| 2,531,412 | Deloraine | Nov. 28, 1950 |
| 2,535,038 | Busignies | Dec. 26, 1950 |
| 2,536,728 | DeSaint Exupery | Jan. 2, 1951 |
| 2,540,087 | Barchok | Feb. 6, 1951 |
| 2,541,982 | Bernstein | Feb. 20, 1951 |
| 2,542,825 | Mesa | Feb. 20, 1951 |
| 2,547,945 | Jenks | Apr. 10, 1951 |